(12) United States Patent
Kim et al.

(10) Patent No.: US 10,178,645 B2
(45) Date of Patent: Jan. 8, 2019

(54) ELECTRONIC DEVICE AND METHOD OF ESTIMATING LOCATION BY ELECTRONIC DEVICE

(71) Applicant: Samsung Electronics Co., Ltd, Gyeonggi-do (KR)

(72) Inventors: Jin-Woo Kim, Seoul (KR); Chae-Man Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/436,717

(22) Filed: Feb. 17, 2017

(65) Prior Publication Data
US 2017/0245238 A1   Aug. 24, 2017

(30) Foreign Application Priority Data
Feb. 19, 2016   (KR) .......................... 10-2016-0020027

(51) Int. Cl.
*H04W 24/00*   (2009.01)
*H04W 64/00*   (2009.01)
*G01S 5/02*   (2010.01)

(52) U.S. Cl.
CPC ......... *H04W 64/003* (2013.01); *G01S 5/0252* (2013.01)

(58) Field of Classification Search
CPC ... H04W 64/003; G01S 5/0252; G01S 5/0242
See application file for complete search history.

(56) References Cited

U.S. PATENT DOCUMENTS

| | | | |
|---|---|---|---|
| 2007/0121560 A1* | 5/2007 | Edge | H04W 64/00 370/338 |
| 2016/0170004 A1 | 6/2016 | Kim et al. | |

FOREIGN PATENT DOCUMENTS

KR   1020160071803   6/2016

* cited by examiner

*Primary Examiner* — Barry W Taylor

(57) ABSTRACT

Disclosed is an electronic device including a memory that stores grid information corresponding to a plurality of grids corresponding to a cell. The electronic device also includes a processor configured to acquire location information of an external electronic device and cell information related to a cell of the external electronic device corresponding to the location information, to calculate at least one active grid corresponding to the location information of the electronic device among the plurality of grids at least based on the location information, to acquire dominant values corresponding to the at least one active grid based on the cell information, to designate the at least one active grid as at least one dominant grid when the dominant values meet a predetermined condition, and to update the cell information when a number of at least one dominant grid meets a predetermined condition. Various embodiments are possible.

20 Claims, 17 Drawing Sheets

ELECTRONIC DEVICE AND METHOD OF ESTIMATING LOCATION BY ELECTRONIC DEVICE

CROSS-REFERENCE TO RELATED APPLICATION(S) AND CLAIM OF PRIORITY

The present application is related to and claims priority under 35 U.S.C. § 119(a) to Korean Application Serial No. 10-2016-0020027, which was filed in the Korean Intellectual Property Office on Feb. 19, 2016, the entire content of which is hereby incorporated by reference.

TECHNICAL FIELD

The present disclosure relates to an electronic device having a communication function and, more particularly, to a method and an apparatus for estimating a location of at least one transmission end by an electronic device.

BACKGROUND

Recently, an external electronic device (for example, a mobile terminal) is widely used based on mobility thereof. Accordingly, the external electronic device may support various services, for example, recommending restaurants based on a location. To this end, it is important to accurately measure the location of the external electronic device.

In order to measure the location of the external electronic device, a location determination system based on a Global Positioning System (GPS) is generally used. However, for the reason such as obstacles within an indoor or urban environment, reception of a GPS signal is limited and thus it may be difficult to use the location determination system. Further, the location of the external electronic device may be measured based on a distance or an angle from, for example, at least one transmission end (for example, a base station) or identified based on the strength of a signal transmitted by the base station. At this time, based on an assumption that one base station includes one transmission point (for example, a base station antenna), it is possible to generate a coverage for the corresponding base station and estimate the location of at least one base station based on the strength of a signal transmitted by the one transmission point.

SUMMARY

As described above, various embodiments to estimate the location have been continuously researched. However, for the reason of obstacles within the environment and limited performance of the electronic device, the strength of the transmitted signal may be changed or one base station consists of a plurality of transmission ends rather than one transmission end to resolve a shaded area or expand a coverage area. In this case, if the location of the base station is estimated based on an assumption that the strength of signals transmitted by the plurality of transmission points corresponds to the strength of signals transmitted by one transmission point, the accuracy may deteriorate.

To address the above-discussed deficiencies, it is a primary object to provide an electronic device and a location estimation method of the electronic device which may estimate a location of the transmission end in consideration of the number of at least one transmission point corresponding to one transmission end and a method of estimating the location by an electronic device.

Further, various embodiments may provide an electronic device and a location estimation method of the electronic device which may generate a coverage corresponding to one transmission end in consideration of the number of at least one transmission point corresponding to the one transmission end and then determine whether the corresponding coverage has been extinct by determining effectiveness of the generated coverage.

In accordance with an aspect of the present disclosure, an electronic device is provided. The electronic device includes: a memory that stores grid information corresponding to a plurality of grids corresponding to a cell; and a processor, wherein the processor is configured to acquire location information of an external electronic device and cell information related to a cell of the external electronic device corresponding to the location information, to calculate at least one active grid corresponding to the location information of the electronic device among the plurality of grids at least based on the location information, to acquire dominant values corresponding to the at least one active grid based on the cell information, to designate the at least one active grid as at least one dominant grid when the dominant values meet a predetermined condition, and to update the cell information when a number of at least one dominant grid meets a predetermined condition.

In accordance with another aspect of the present disclosure, an electronic device is provided. The electronic device includes: a communication module; and a processor that collects transmission end information acquired from at least one transmission end and location information of a point where the transmission end information is acquired through the communication module by at least one external electronic device, generates a coverage map corresponding to the at least one transmission end based on the collected transmission end information and location information, and estimates locations of the at least one transmission end based on the generated coverage map.

In accordance with another aspect of the present disclosure, a method of estimating a location by an electronic device is provided. The method includes: collecting transmission end information acquired from at least one transmission end and location information of a point where the transmission end information is acquired through the communication module by at least one external electronic device; generating a coverage map corresponding to the at least one transmission end based on the collected transmission end information and location information; and estimating locations of the at least one transmission end based on the generated coverage map.

Various embodiments may propose a scheme of estimating a location of a base station as a method of positioning a transmission end by an electronic device.

Further, according to various embodiments, it is possible to more accurately estimate the location of the transmission end by estimating the number and locations of at least one transmission point (for example, base station antenna) corresponding to one base station.

According to various embodiments, the problem of reception capability or reception environment can be removed by estimating a location of a base station based on transmission end measurement information such as Timing Advance (TA) or Received Signal Strength Indicator (RSSI).

According to various embodiments of the present disclosure, a location of a base station, which is estimated by collecting base station information acquired by at least one external electronic device (for example, mobile terminal) and location information of at least one external electronic device at a point where the base station information is acquired, may be transmitted to at least one external electronic device, and the location information of the base station estimated by the electronic device may be used for positioning the external electronic device or a location-based service.

According to various embodiments of the present disclosure, the electronic device may determine effectiveness of a coverage corresponding to the estimated base station to determine whether the corresponding coverage has become extinct, thereby efficiently managing cells within a cellular network and accordingly increasing accuracy of positioning of the external electronic device based on the location of the corresponding base station as a reference location.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
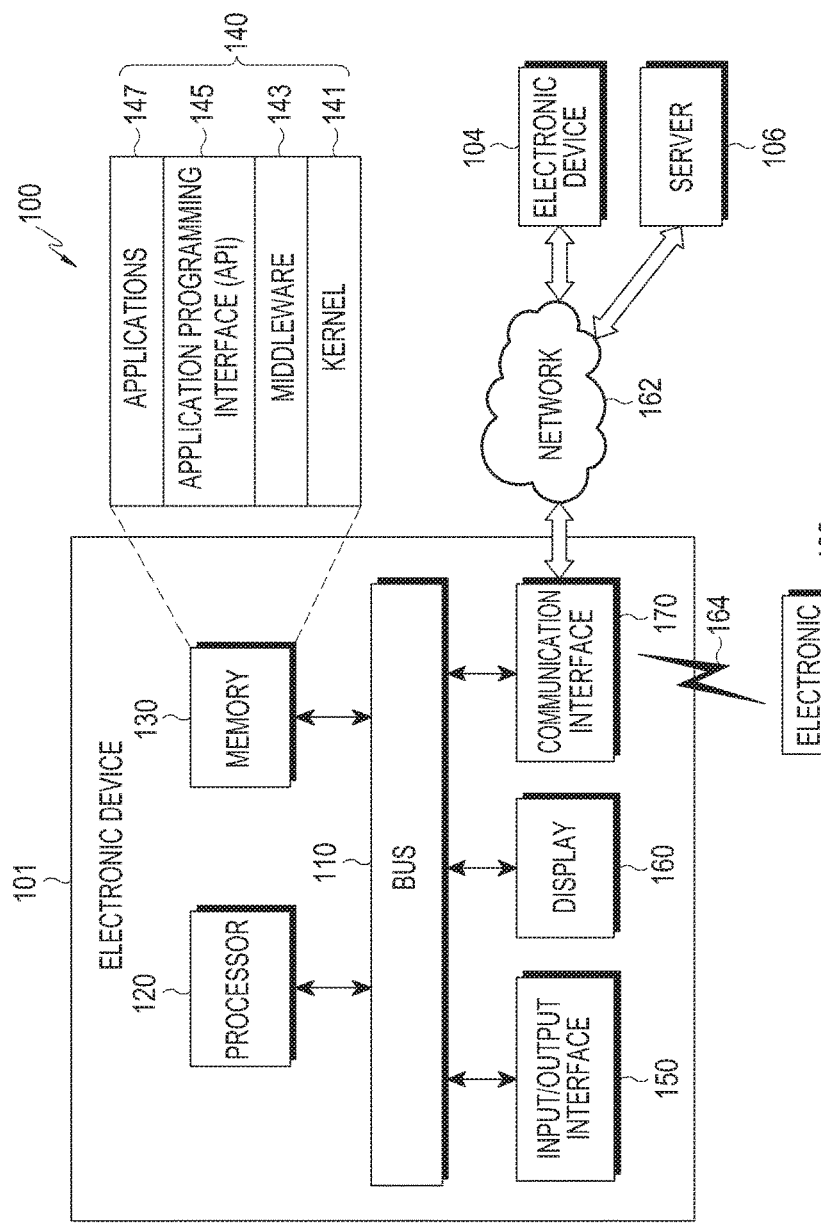
FIG. 1 illustrates a network environment including an electronic device according to various embodiments of the present disclosure.

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, various embodiments of the present disclosure will be described with reference to the accompanying drawings. The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context. As used herein, singular forms may include plural forms as well unless the context clearly indicates otherwise. The expression "a first", "a second", "the first", or "the second" used in various embodiments of the present disclosure may modify various components regardless of the order and/or the importance but does not limit the corresponding components. When an element (e.g., first element) is referred to as being "(functionally or communicatively) connected," or "directly coupled" to another element (second element), the element may be connected directly to the another element or connected to the another element through yet another element (e.g., third element).

The expression "configured to" as used in various embodiments of the present disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit). In some embodiments, the electronic device may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyrocompass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, an electronic device may include at least one of a part of furniture or a building/structure, an electronic board, an electronic signature receiving device, a projector, and various types of measuring instruments (e.g., a water meter, an electric meter, a gas meter, a radio wave meter, and the like). In various embodiments, the electronic device may be flexible, or may be a combination of one or more of the aforementioned various devices. The electronic device according to one embodiment of the present disclosure is not limited to the above described devices. In the present disclosure, the term "user" may indicate a person using an electronic device or a device (e.g., an artificial intelligence electronic device) using an electronic device.

An electronic device 101 within a network environment 100, according to various embodiments, will be described with reference to FIG. 1. The electronic device 101 may include a bus 110, a processor 120, a memory 130, an input/output interface 150, a display 160, and a communication interface 170. In some embodiments, the electronic device 101 may omit at least one of the elements, or may further include other elements.

The bus 110 may include, for example, a circuit that interconnects the elements 110 to 170 and transfers communication (for example, control messages and/or data) between the elements.

The processor 120 may include one or more of a central processing unit, an application processor, and a communication processor (CP). The processor 120, for example, may carry out operations or data processing relating to the control and/or communication of at least one other element of the electronic device 101.

The memory 130 may include a volatile and/or non-volatile memory. The memory 130 may store, for example, instructions or data relevant to at least one other element of the electronic device 101. According to an embodiment, the memory 130 may store software and/or a program 140. The program 140 may include, for example, a kernel 141, middleware 143, an application programming interface (API) 145, and/or application programs (or "applications") 147.

At least a part of the kernel 141, the middleware 143, or the API 145 may be referred to as an Operating System (OS). The kernel 141 may control or manage system resources (for example, the bus 110, the processor 120, or the memory 130) used for executing an operation or function implemented by other programs (for example, the middleware 143, the API 145, or the application 147). Furthermore, the kernel 141 may provide an interface through which the middleware 143, the API 145, or the application programs 147 may access the individual elements of the electronic device 101 to control or manage the system resources.

The middleware 143 may function as, for example, an intermediary for allowing the API 145 or the application programs 147 to communicate with the kernel 141 to exchange data. Furthermore, the middleware 143 may process one or more task requests, which are received from the application programs 147, according to priorities thereof. For example, the middleware 143 may assign priorities for using the system resources (for example, the bus 110, the processor 120, the memory 130, and the like) of the electronic device 101 to at least one of the application programs 147, and process the one or more task requests.

The API 145 is an interface used by the application 147 to control a function provided from the kernel 141 or the middleware 143, and may include, for example, at least one interface or function (for example, an instruction) for a file control, a window control, image processing, a character control, or the like.

For example, the input/output interface 150 may forward instructions or data, which is input from a user or an external device, to the other element(s) of the electronic device 101, or may output instructions or data, which is received from the other element(s) of the electronic device 101, to the user or the external device.

The display 160 may include, for example, a Liquid Crystal Display (LCD), a Light Emitting Diode (LED)

display, an Organic Light Emitting Diode (OLED) display, a Micro Electro Mechanical System (MEMS) display, or an electronic paper display. The display 160 may display, for example, various types of content (e.g., text, images, videos, icons, and/or symbols) for a user. The display 160 may include a touch screen and may receive, for example, a touch, gesture, proximity, or hovering input using an electronic pen or the user's body part.

The communication interface 170 may configure communication, for example, between the electronic device 101 and an external device (for example, a first external electronic device 102, a second external electronic device 104, or a server 106). For example, the communication interface 170 may be connected to a network 162 through wireless or wired communication to communicate with the external device (for example, the second external electronic device 104 or the server 106).

The wireless communication may include, for example, a cellular communication that uses at least one of LTE, LTE-Advance (LTE-A), code division multiple access (CDMA), wideband CDMA (WCDMA), universal mobile telecommunications system (UMTS), wireless broadband (WiBro), global system for mobile communications (GSM), and the like. According to an embodiment, the wireless communication may include, for example, at least one of Wi-Fi, Bluetooth, Bluetooth low energy (BLE), ZigBee, near field communication (NFC), magnetic secure transmission, Radio Frequency (RF), and body area network (BAN). According to an embodiment, the wired communication may include GNSS. The GNSS may be, for example, a global positioning system (GPS), a global navigation satellite system (Glonass), a Beidou navigation satellite system (hereinafter, referred to as "Beidou"), or Galileo (the European global satellite-based navigation system). Hereinafter, in this document, the term "GPS" may be interchangeable with the term "GNSS". The wired communication may include, for example, at least one of a Universal Serial Bus (USB), a High Definition Multimedia Interface (HDMI), Recommended Standard 232 (RS-232), a Plain Old Telephone Service (POTS), etc. The network 162 may include a telecommunications network, for example, at least one of a computer network (for example, a LAN or a WAN), the Internet, and a telephone network.

Each of the first and second external electronic devices 102 and 104 may be of the same or a different type from the electronic device 101. According to various embodiments, all or some of the operations executed in the electronic device 101 may be executed in another electronic device or a plurality of electronic devices (for example, the electronic devices 102 and 104 or the server 106). According to an embodiment, when the electronic device 101 has to perform some functions or services automatically or in response to a request, the electronic device 101 may request another device (for example, the electronic device 102 or 104 or the server 106) to perform at least some functions relating thereto instead of, or in addition to, performing the functions or services by itself. The other electronic device (for example, the electronic device 102 or 104 or the server 106) may perform the requested functions or the additional functions and may transfer the execution result to the electronic device 101. The electronic device 101 may provide the received result as it is, or may additionally process the received result to provide the requested functions or services. To this end, for example, cloud computing, distributed computing, or client-server computing technology may be used.

The term "module" as used herein may include a unit consisting of hardware, software, or firmware, and may, for example, be used interchangeably with the term "logic", "logical block", "component", "circuit", or the like. The "module" may be an integrated component, or a minimum unit for performing one or more functions or a part thereof. The "module" may be mechanically or electronically implemented and may include, for example, an Application-Specific Integrated Circuit (ASIC) chip, a Field-Programmable Gate Arrays (FPGA), or a programmable-logic device, which has been known or are to be developed in the future, for performing certain operations. At least some of devices (e.g., modules or functions thereof) or methods (e.g., operations) according to various embodiments may be implemented by an instruction which is stored a computer-readable storage medium (e.g., the memory 130) in the form of a program module. The instruction, when executed by a processor (e.g., the processor 120), may cause the one or more processors to execute the function corresponding to the instruction. The computer-readable storage medium may include a hard disk, a floppy disk, a magnetic medium (e.g., a magnetic tape), an Optical Media (e.g., CD-ROM, DVD), a Magneto-Optical Media (e.g., a floptical disk), an inner memory, etc. The instruction may include a code which is made by a compiler or a code which may be executed by an interpreter. The programming module according to the present disclosure may include one or more of the aforementioned components or may further include other additional components, or some of the aforementioned components may be omitted. Operations performed by a module, a programming module, or other elements according to various embodiments may be executed sequentially, in parallel, repeatedly, or in a heuristic manner. At least some operations may be executed according to another sequence, may be omitted, or may further include other operations.

Figure 2A:
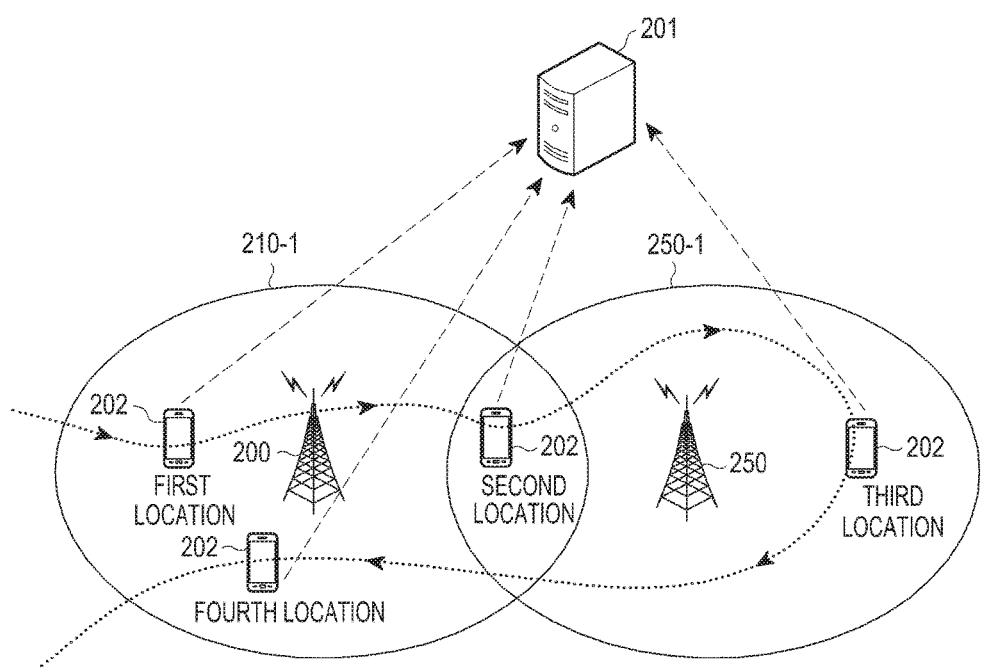
FIG. 2A is a diagram illustrating that an electronic device collects transmission end information and location information acquired at each movement point of an external electronic device that moves within at least one cell managed by at least one transmission end according to various embodiments.

FIG. 2A is a diagram illustrating that an electronic device collects transmission end information and location information acquired at each movement point of an external electronic device that moves within at least one cell managed by at least one transmission end according to various embodiments. FIG. 2A illustrates base stations 200 and 250 as examples of a transmission end that an external electronic device 202 (for example, a mobile terminal) accesses to receive a mobile communication service.

Although FIG. 2A describes a case where the transmission ends correspond to the base stations 200 and 250 as an example, the transmission end is not limited thereto if the transmission end can provide transmission end information to the external electronic device 202. For example, the transmission end may be referred to as an "Access Point (AP)", "node B", "beacon", or another term as well as the fixed base station 200 or 250 communicating with the external electronic device 202. Further, the coverage may be referred to as a base station and/or a cell according to context in which the term is used. The base station may have various sizes and shapes of coverage areas that may be determined by various factors such as topography, obstacles, and the like.

Referring to FIG. 2A, it may be noted that the external electronic device 202 moves within at least one coverage 210-1 and 250-1 managed by at least one transmission end 200 and 250. The external electronic device 202 may be within the coverage 210-1 managed by the transmission end 200 at a first location and a fourth location, and may acquire transmission end information (for example, cell information) of the transmission end 200 from the transmission end 200 at the first location. The external electronic device 202 may be within the coverage 250-1 managed by the transmission end 250 at a third location, and may acquire transmission end information of the transmission end 250 from the transmission end 250 at the third location. The external electronic device 202 may be within the coverage 210-1 managed by the transmission end 200 and the coverage 250-1 managed by the transmission end 250 at a second location. At the second location, the external electronic device 202 may acquire transmission end information (for example, first transmission end information) of the corresponding transmission end 200 from the transmission end 200 with the coverage 210-1 of the transmission end 200 as a serving cell and also acquire transmission end information (for example, second transmission end information) of the corresponding transmission end 250 from the transmission end 250 with the coverage 250-1 of the transmission end 250 as a neighbor cell. The external electronic device 202 may periodically or aperiodically report the transmission end information acquired at each location (for example, the first location, the second location, the third location, or the fourth location) to the electronic device 201. For example, the report may be performed when a communication connection between the electronic device 201 and the external electronic device 202 is made through Wi-Fi.

The external electronic device 202 may transmit/receive data through at least one base station 200 or 250 while moving from the first location to the third location via the second location in the cell area 210-1 or 250-1 managed by at least one transmission end 200 or 250, or transmit/receive data through at least one transmission end 200 or 250 while staying in at least one location among the first to third locations. For example, when the cell area 210-1 or 250-1 is the coverage of a 3GPP LTE system, the external electronic device 202 may receive a mobile communication service by the base station 200 or 250 of the cell which the external electronic device 202 accesses.

According to various embodiments, a coordinate (location) of at least one base station 200 or 250 that manages at least one coverage 210-1 or 250-1 in which the external electronic device 202 is positioned may be used as a reference location for measuring the location of the external electronic device 202. The coordinate of at least one base station 200 or 250 does not include a geographical location of the external electronic device 202, but may be used for estimating the location of the external electronic device 202. In order to calculate the coordinate of at least one base station 200 or 250, various embodiments of the present disclosure may use a coverage map generated using transmission end information acquired by the external electronic device 202 from at least one base station 200 or 250 and location information of the external electronic device 202 acquired from a GPS satellite at the position where the transmission end information is acquired. The transmission end information and the location information will be described in more detail with reference to FIG. 3.

Figure 2B:
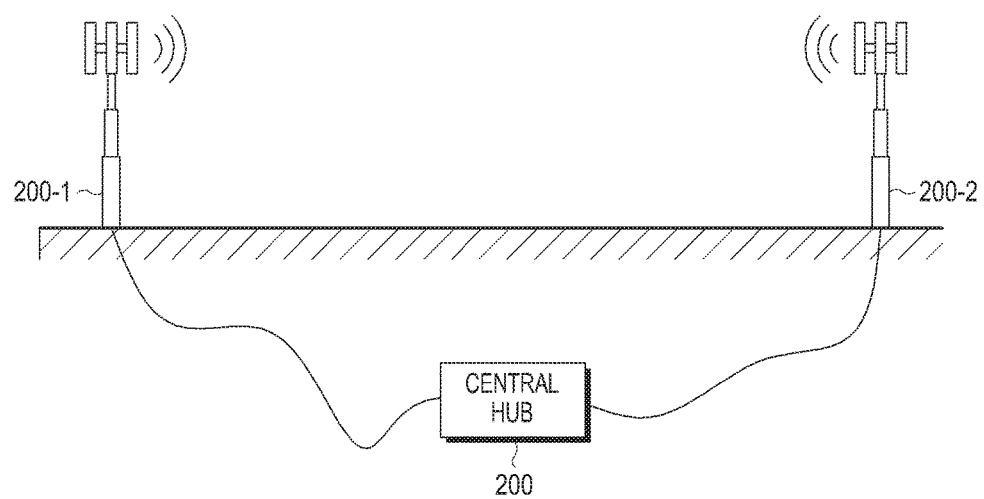
FIG. 2B is a diagram illustrating coverage expansion using at least one transmission point corresponding to one particular transmission end according to various embodiments.

FIG. 2B is a diagram illustrating coverage expansion using at least one transmission point corresponding to one particular transmission end according to various embodiments.

Referring to FIG. 2B, one particular transmission end 200 (for example, the base station) may include at least one transmission point 200-1 or 200-2 (for example, a base station antenna). For example, the base station 200 may serve as a central hub and expand the coverage of the base station 200 by transmitting the same signal generated from the central hub 200 through at least one transmission point 200-1 or 200-2 corresponding to the base station 200.

Referring to FIGS. 2A and 2B, when one base station 200 includes at least one transmission point 200-1 and 200-2 rather than a single transmission point and thus the corresponding coverage expands, the electronic device 201 according to various embodiments may increase the accuracy for the estimation of the location of the base station 200 through accurate determination of the number and locations of at least one transmission points 200-1 and 200-2.

Figure 3:
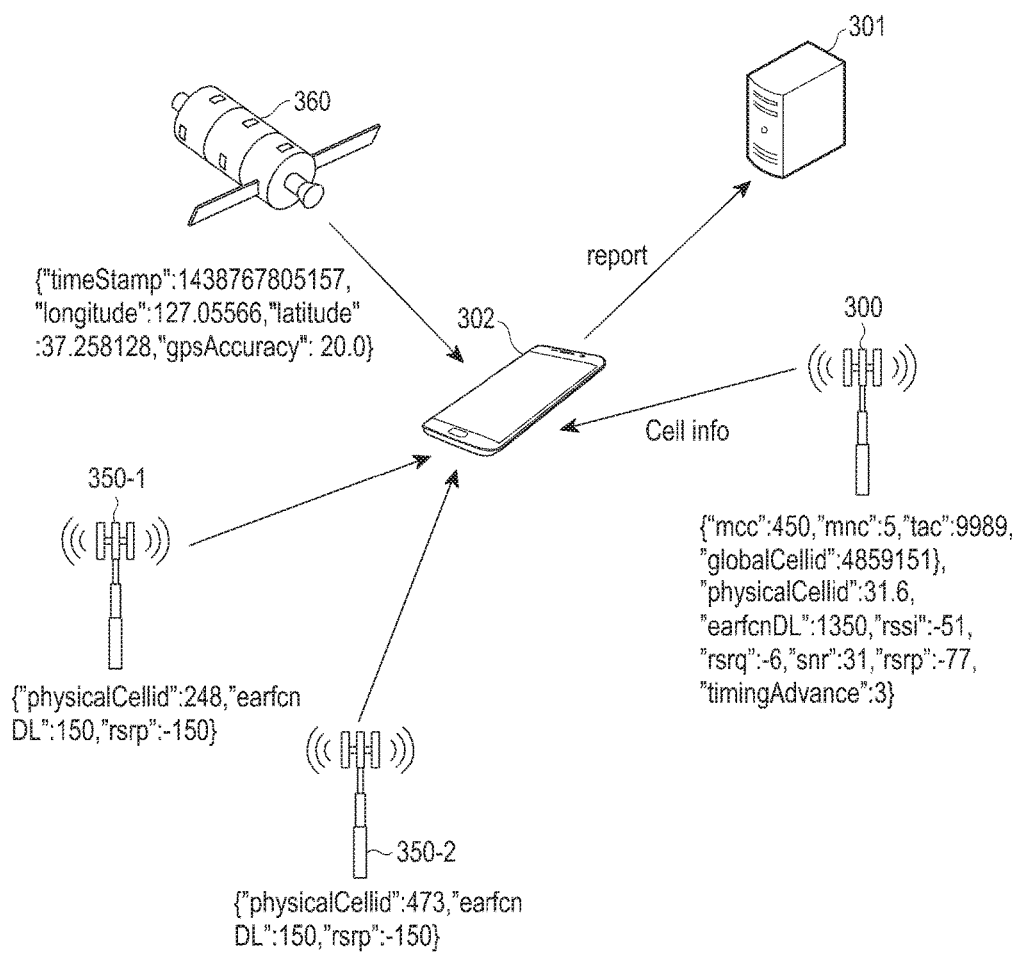
FIG. 3 illustrates an example for describing collection of transmission end information and location information reported from an external electronic device by the electronic device according to various embodiments.

FIG. 3 illustrates an example for describing collection of transmission end information and location information reported from the external electronic device by the electronic device according to various embodiments.

Referring to FIG. 3, an electronic device 301 according to various embodiments may collect at least one piece of transmission end information, which an external electronic device 302 acquires from at least one transmission end 300, 350-1, or 350-2, from the external electronic device 302.

According to an embodiment, at least one transmission end information may include first transmission end information provided from the first transmission end 300 (for example, the base station or the base station antenna) corresponding to a serving cell and second transmission end information provided form each of at least one second transmission end 350-1 or 350-2 corresponding to a neighbor cell. The location information may be generated by collecting location information of the external electronic device 302 at a position where at least one piece of the first transmission end information (for example, serving cell information) and the second transmission end information (for example, neighbor cell information) provided from a location-based system such as a GPS device 360. In this document, the term "collected information" may be used as the term including the transmission end information and the location information.

According to an embodiment, the first transmission end information provided from the first transmission end 300 corresponding to the serving cell may include first network information of the first transmission end and first measurement information measured by the first transmission end 300. For example, the first network information may include information on at least one of a Mobile Country Code (MCC), a Mobile Network Code (MNC), a Tracking Area Code (TAC), a Global Cell Identifier (GCI), a Physical Cell Identifier (PCI), and an E-UTRA Absolute Radio Frequency Channel Number (EARFCN), and the first measurement information may include information on at least one of a Received Signal Strength Indication (RSSI), a Reference Signal Received Quality (RSRQ), a Signal to Noise Ratio (SNR), a Reference Signal Received Power (RSRP), and Time Advance (TA).

According to an embodiment, the second transmission end information provided from the second transmission end 350-1 or 350-2 corresponding to the neighbor cell may include second network information of the second transmission end and second measurement information measured at the second transmission end 350-1 or 350-2. For example, the second network information may include information on at least one of a PCI and an EARFCN, and the second measurement information may include information on an RSRP.

According to an embodiment, the location information of the external electronic device 302 provided from the GPS device 360 may include information on at least one of a time stamp for time information, longitude information, latitude information, and location error information (GPS accuracy). The time information may include a time at a time point when at least one piece of the first transmission end information and the second transmission end information is acquired. The longitude information and the latitude information may include location information on a location where at least one piece of the first transmission end information and the second transmission end information is acquired.

The electronic device 301 may receive a report on the transmission end information (for example, at least one piece of the first transmission end information and the second transmission end information) and the location information from at least one external electronic device 302.

According to an embodiment, when a communication connection between the electronic device 301 and the external electronic device 302 is made through a predetermined communication module (for example, a Wi-Fi module), the electronic device 301 may receive a report on the transmission end information or the location information of the external electronic device 302 from the external electronic device 302. Accordingly, when the communication connection between the electronic device 301 and the external electronic device 302 is made through the Wi-Fi module, the electronic device 301 may collect the transmission end information and the location information which the external electronic device 302 has acquired. The electronic device 301 may generate a coverage map including coverage information corresponding to each of at least one transmission end 300, 350-1, and 350-2 based on the collected information and estimate the location of the corresponding transmission end based on the generated coverage map.

Figure 4:
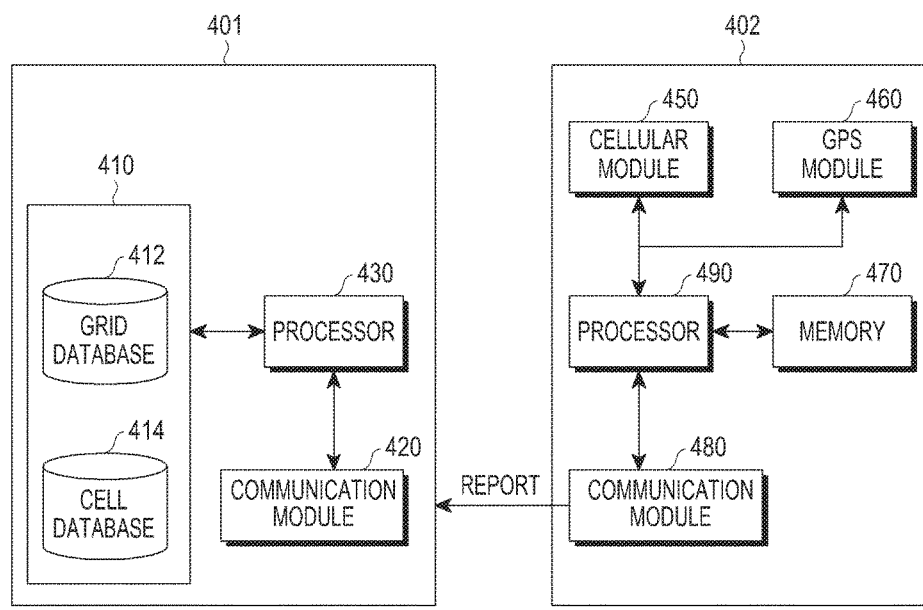
FIG. 4 is a block diagram illustrating each of an electronic device and an external electronic device according to various embodiments.

FIG. 4 is a block diagram illustrating each of an electronic device and an external electronic device according to various embodiments.

Referring to FIG. 4, an electronic device 401 may include elements for estimating locations of the transmission end (for example, the base station) or a plurality of transmission points (for example, base station antennas) of the transmission end based on the collected information reported from the external electronic device 402 and, to this end, may include at least one of a memory 410 including at least one of a grid database 412 and a cell database 414, a communication module 420, and a processor 430. The processor 430 may include some or all of the processor 120 illustrated in FIG. 1.

The processor 430 may generally control the electronic device 401. According to an embodiment, the processor 430 may estimate the location of the transmission end (for example, the base station or the base station antenna) stored in the cell database 414 based on the collected information reported from the external electronic device (for example, the external electronic device 302). The location of the transmission end, that is, a cell coordinate may be used as a reference location of the external electronic device 402. The processor 430 may store the location information and transmission end information corresponding to the location information in the grid database 412 within the memory 410 in accordance with each of a plurality of grids divided based on a predetermined location having a predetermined size (for example, latitude and longitude).

According to an embodiment, the processor 430 may perform a quantization of mapping the collected location information (for example, latitude and longitude) to each of the plurality of grids. A method of mapping the location information to each of the plurality of grids will be described with reference to FIG. 5.

Figure 5:
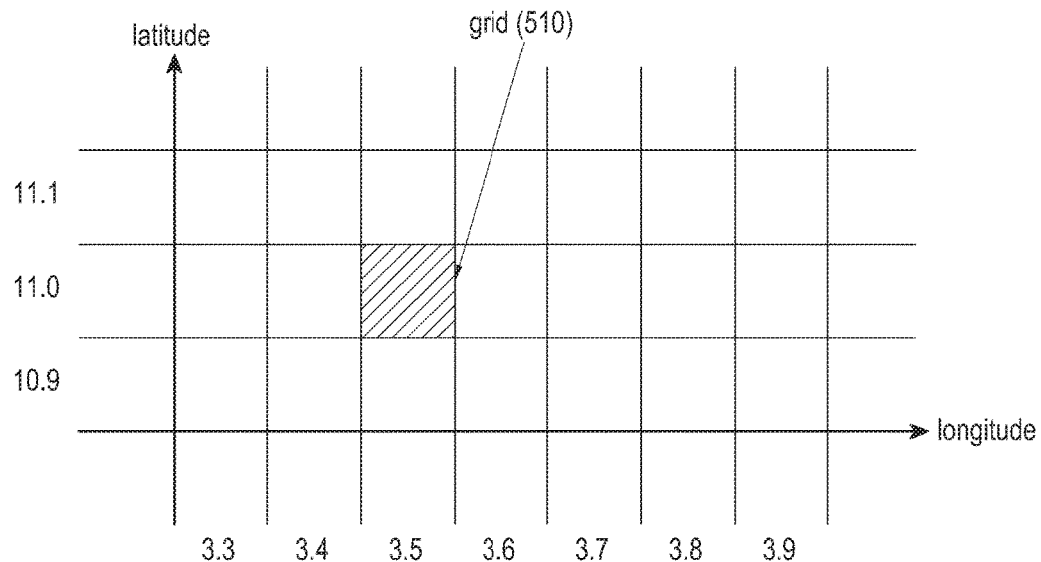
FIG. 5 illustrates an example of grids of a coverage map according to various embodiments.

FIG. 5 illustrates a grid of a coverage map according to various embodiments.

Referring to FIG. 5, the processor 430 may make a geographically specific area correspond to, for example, a grid having a predetermined shape and size in accordance with the collected location information. For example, one grid may correspond to one coordinate having latitude and longitude. Although FIG. 5 illustrates that latitude and longitude which correspond to the location information are divided to have grid shapes at an interval of 0.1 degrees, the present disclosure is not limited thereto, and the grid may be divided to have various shapes and sizes (intervals).

According to an embodiment, the processor 430 may perform the quantize to make the location information collected from the external electronic device 402 correspond to each of the plurality of grids divided as illustrated in FIG. 5. For example, when a longitude value of the collected location information is closest to 3.5 and a latitude value of the collected location information is closest to 11.0, the processor 430 may quantize the collected location information to the grid 510 having coordinates (3.5, 11.0).

Meanwhile, a grid at a location corresponding to transmission end information received from one transmission end (for example, cell A) may be defined as an active grid of the corresponding transmission end. The active grid will be described in more detail with reference to FIG. 6.

Figure 6:
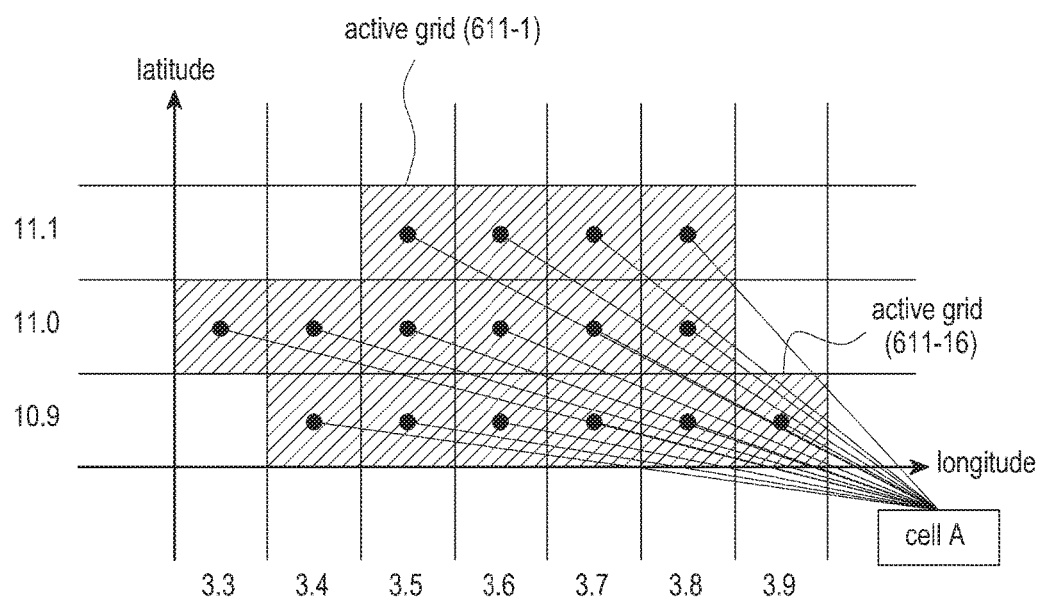
FIG. 6 illustrates an example of active grids of a coverage map according to various embodiments.

FIG. 6 illustrates an active grid of a coverage map according to various embodiments.

Referring to FIG. 6, when location information corresponding to a particular base station is collected, the processor 430 may determine a grid corresponding to each location of the collected location information as an active grid. For example, transmission end information of one transmission end (for example, cell A) may be received at a plurality of locations by each of a plurality of external electronic devices, so that the one transmission end (for example, cell A) may include a plurality of active grids. In FIG. 6, cell A which is one transmission end has active grids expressed by a total of 16 latitude and longitude indexes from an active grid 611-1 having a coordinate (3.5, 11.1) to an active grid 611-16 having a coordinate of (3.9, 10.9). According to an embodiment, when collected information of the transmission end (for example, cell A) is quantized into active grids (i, j) of the transmission end (cell A) and new transmission end information for the quantized active grids is collected, the processor 430 may update the transmission end information of the quantized active grids. This may be expressed by, for example, equation (1) and equation (2) below.

$$TA_{(i,j)} \leftarrow (1 - \alpha) \times TA_{(i,j)} + \alpha \times TA_{new} \quad (1)$$

$$RSS_{(i,j)} \leftarrow (1 - \alpha) \times RSS_{(i,j)} + \alpha \times RSS_{new} \quad (2)$$

In equations (1) an d(2), $TA_{(i,j)}$ and $RSS_{(i,j)}$ correspond to transmission end information of the corresponding transmission end (cell A) stored in the active grid (i, j) of the transmission end (cell A) before the information is updated and are Timing Advance (TA) information and Received Signal Strength (RSS) information, respectively. $TA_{new}$ and $RSS_{new}$ are TA information and RSS information, respectively, of the corresponding transmission end (cell A) newly collected in accordance with the active grid (i, j), and a is α weighted value having a value equal to or smaller than 1.

According to an embodiment, the processor 430 may configure a bound grid set for at least one active grid of one transmission end (for example, cell A). A method of configuring the bounding grid set will be described in more detailed with reference to FIG. 7.

Figure 7:
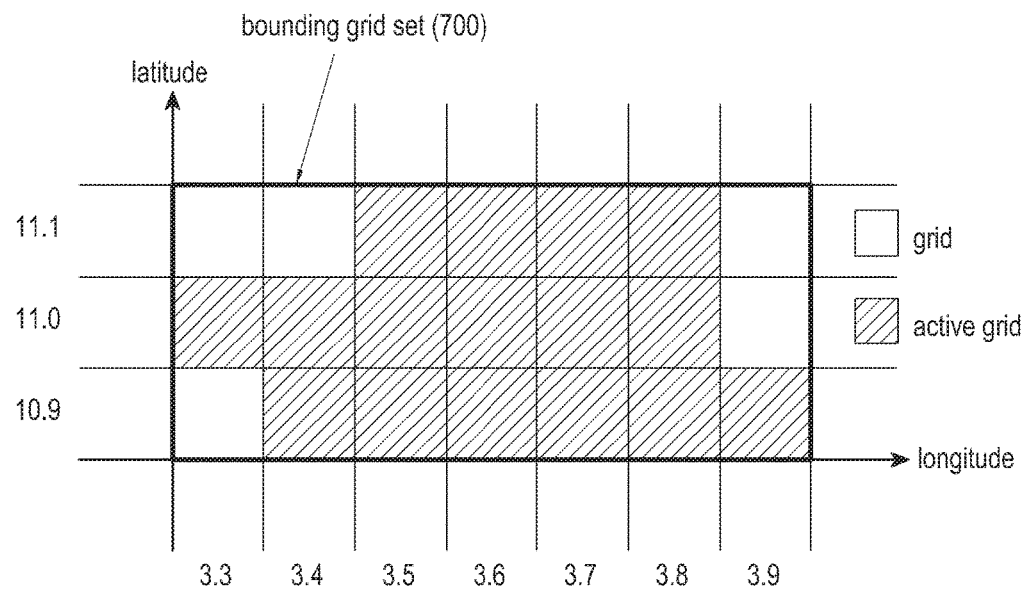
FIG. 7 illustrates an example of a bounding grid set of a coverage map according to various embodiments.

FIG. 7 illustrates an example of a bounding grid set of a coverage map according to various embodiments.

Referring to FIG. 7, the processor 430 may configure a bounding grid set 700 by the smallest figure (for example, rectangle) that surrounds a plurality of active grids. The processor 430 may configure the bounding grid set 700 to limit a range of candidate points when estimating the location of at least one transmission point (for example, a plurality of base station antennas) which may exist in one coverage (for example, cell A) corresponding to one particular transmission end (for example, the base station).

Although FIG. 7 illustrates the bounding grid set 700 by the minimum rectangle that surrounds the plurality of active grids, the present disclosure is not limited thereto and various forms of candidate point ranges may be configured. For example, the processor 430 may assume that one candidate point within the configured bounding grid set 700 as the location of at least one transmission point corresponding to the one particular transmission end. The processor 430 may calculate a location estimation value of the corresponding candidate point to determine whether the candidate point assumed as the location of at least one transmission end is proper.

According to an embodiment, when it is assumed that the number of at least one transmission point for one particular transmission end is 1, the processor 430 may calculate a location estimation value assumed as the candidate point for each of a plurality of grids within the bounding grid set 700. For example, the processor 430 may calculate 21 location estimation values for the plurality of grids corresponding to 21 grids within the bounding grid set 700 as illustrate din FIG. 7. The processor 430 may estimate, as one transmission point corresponding to one particular transmission end, a candidate point corresponding to a maximum value among the 21 location estimation values calculated for the plurality of grids corresponding to the 21 grids within the bounding grid set 700. For example, the processor 430 may estimate actual location information (for example, longitude and latitude coordinates) collected from at least one external electronic device mapped to the candidate point corresponding to the maximum value among the calculated location estimation values as the location of one transmission end corresponding to the one particular transmission end. A method of calculating the location estimation value will be described in more detailed with reference to [Table 1] below and FIG. 8.

Figure 8:
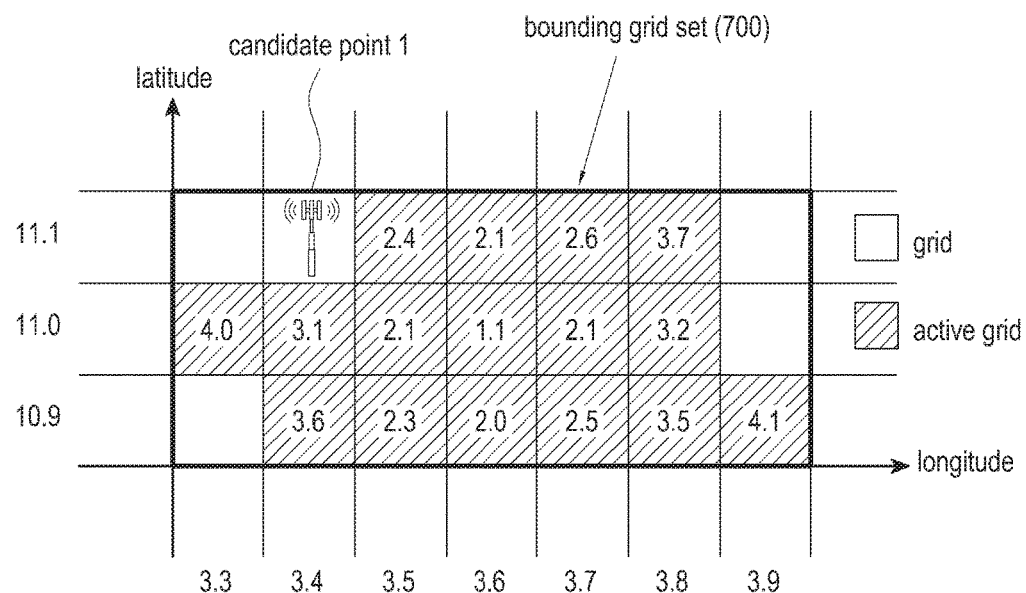
FIG. 8 illustrates an example of candidate points of at least one transmission end in a coverage map according to various embodiments.

FIG. 8 illustrates an example of candidate points of at least one transmission end in a coverage map according to various embodiments.

Referring to FIG. 8, when it is assumed that the number of at least one transmission point is 1 and the transmission point is location at candidate point 1 (for example, coordinate (3.1, 11.1) corresponding to one grid within the bounding grid set 700, an example of displaying the average of accumulated TA values corresponding to each of the plurality of active grids is illustrated, and [Table 1] shows a distance rank and a TA rank corresponding to each of the plurality of active grids for candidate point 1.

TABLE 1

| Active grid | Rank of distance from candidate point 1 (for example, 3.4, 11.1) | TA (timing advance) | TA rank |
|---|---|---|---|
| (3.5, 11.1) | 1 | 2.4 | 7 |
| (3.4, 11.0) | 1 | 3.1 | 9 |
| (3.3, 11.0) | 2 | 4.0 | 15 |
| (3.5, 11.0) | 2 | 2.1 | 3 |
| ... | ... | ... | ... |
| (3.9, 10.9) | 16 | 4.1 | 16 |

Referring to FIG. 8 and [Table 1], the processor 430 may calculate the rank of distances between candidate point 1 and the active grids based on candidate point 1. The processor 430 may calculate Timing Advance (TA) rank for the active grids. The processor 430 may calculate a rank correlation of candidate point 1 based on the calculated distance rank and TA rank.

The processor 430 may configure each of the plurality of grids within the bounding grid set 700 as the candidate point and repeatedly perform an operation of calculating the distance rank, the TA rank, and the rank correlation of the set candidate points as described above.

After calculating the rank correlation between the calculated distance rank and the TA rank for the plurality of grids within the bounding grid set 700, the processor 430 may estimate a grid having a maximum rank correlation among the calculated rank correlations of the plurality of grids as the location of at least one transmission end of the transmission end (for example, cell A). For example, when the configured bounding grid set 700 includes a total of 21 grids as illustrated in FIG. 7, the processor 430 may configure each of the plurality of grids as the candidate point and perform the operation of calculating the correlation between the distance rank and the TA rank for the candidate point 21 times. Accordingly, when the rank correlations for all the grids within the bounding grid set 700 are calculated, the processor 430 may estimate the grid having the maximum rank correlation between the calculated rank correlations of the plurality of grids as the location of at least one transmission point.

The rank correlation ($\rho$) may be calculated by equation (3) below.

$$\rho = 1 - \frac{6\sum d_i^2}{n(n^2-1)}, \quad d_i = x_i - y_i \qquad (3)$$

In equation (3), n denotes the number of a plurality of active grids within the bounding grid set, $x_i$ denotes a distance rank of an $i^{th}$ grid among the plurality of active grid within the bounding grid set, and $y_i$ denotes an $i^{th}$ TA rank (or RSSI rank) among the plurality of active grid within the bounding grid set.

Although the description has been made based on the correlation between the distance rank and the TA rank in FIG. 8 and [Table 1], the present disclosure is not limited thereto, and it may be understood by those skilled in the art that the locations of at least one transmission points corresponding to the transmission end can be estimated using the RSSI range instead of the TA rank and also the rank of information if the information is relevant to the distance between the external electronic device and the transmission end.

According to an embodiment, when it is assumed that the number of at least one transmission point is 2, the processor 430 may estimate locations of the two transmission points corresponding to one particular transmission end. In this case, estimating the best combination of the locations of the two transmission points is the key to the processor 430. For example, as illustrated in FIG. 8, when it is assumed that the number of at least one transmission point is 1, if the size of the bounding grid set 700, that is, the number of the plurality of grids within the bounding grid set 700 is 1, the processor 430 may calculate one rank correlation and estimate a grid having a maximum rank correlation among the calculated rank correlations as the transmission point of the corresponding transmission end. However, when it is assumed that the number of transmission points of the corresponding transmission end is 2, the processor 430 may group n active grids within the bounding grid set into two clusters (for example, cluster 1 and cluster 2) and estimate the best location combination of the two transmission points among combinations of the grouped two clusters. A method of calculating the location estimation values of the two transmission points will be described with reference to FIGS. 9A and 9B.

Figure 9A:
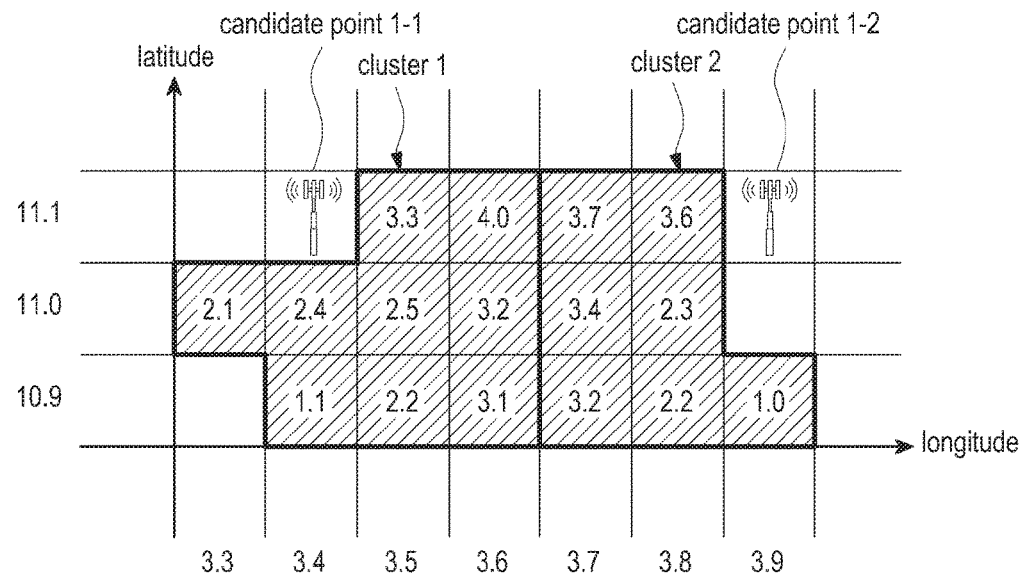
FIGS. 9A and 9B illustrate examples of candidate points of at least one transmission end in a coverage map according to various embodiments.
Figure 9B:
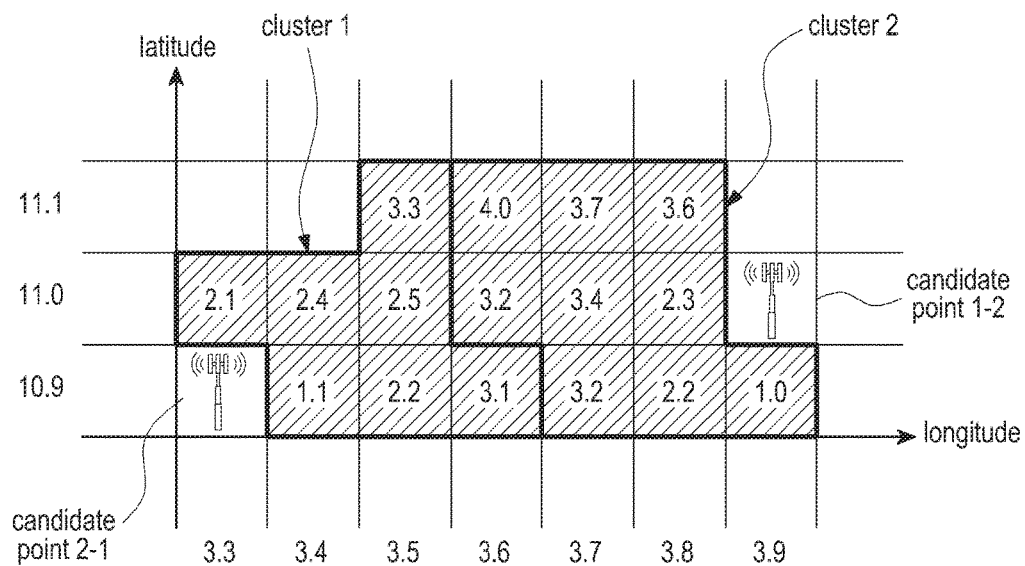

FIGS. 9A and 9B illustrate examples of candidate points of at least one transmission end in a coverage map according to various embodiments.

Referring to FIG. 9A, the processor 430 may assume that the two transmission points are located at candidate point 1-1 (for example, coordinate (3.4, 11.1)) and candidate point 1-2 (for example, coordinate (3.9, 11.1)). Further, referring to FIG. 9B, the processor 430 may assume that the two transmission points are located at candidate point 2-1 (for example, coordinate (3.3, 10.9)) and candidate point 2-2 (for example, coordinate (3.9, 11.0)).

When the number of transmission points is 2, the processor 430 may group n active grids into cluster 1 corresponding to candidate point 1-1 and cluster 2 corresponding to candidate point 1-2 as illustrated in FIG. 9A, or into cluster 1 corresponding to candidate point 2-1 and cluster 2 corresponding to candidate point 2-2 as illustrated in FIG. 9B. As described above, when the number of transmission points is 2, the processor 430 may group the n active grids into two clusters and calculate location estimation values in consideration of matching for each location combination according to the number of available location combinations of the candidate points from the grouped two clusters.

The number of available combinations of the two clusters may be calculated using equation (4).

$$\binom{l}{2} = l(l-1)/2 \qquad (4)$$

For example, when the size (1) of the bounding grid set, that is, the number of the plurality of grids within the bounding grid set is 21, the number of available combinations of the candidate points may be 210 calculated using equation (4) above from the two clusters (for example, cluster 1 and cluster 2) grouped from the plurality of active grids within the bounding grid set.

The location estimation value according to the number of combinations (for example, 210) may be calculated using equation (5) below.

$$\rho = \frac{n_1 \rho_1 + n_2 \rho_2}{n_1 + n_2} \qquad (5)$$

In equation (5), $n_1$ and $n_2$ denote sizes of cluster 1 and cluster 2 grouped by the assumed two transmission points, and $\rho_1$ and $\rho_2$ denote rank correlations within cluster 1 and cluster 2. The size of each of cluster 1 and cluster 2 may be the number of active grids included in the corresponding cluster.

According to an embodiment, the processor 430 may calculate a location estimation value of each candidate point in consideration of a case where the number of at least one transmission point corresponding to one particular transmission end (for example, cell A) is m. For example, the processor 430 may calculate the location estimation value for each candidate point in the case where the number transmission points is m through equation (6) below expanded from equation (5) above.

$$\rho = \frac{n_1 \rho_1 + n_2 \rho_2 + \cdots + n_M \rho_M}{n_{total}} \qquad (6)$$

In equation (6), $n_M$ denotes the size of corresponding cluster M, $n_{total}$ denotes the number of clusters, and $\rho_M$ denotes a rank correlation of corresponding cluster M. The size of cluster M may be the number of active grids included in the corresponding cluster.

According to an embodiment, when the processor 430 cannot know the number of at least one transmission points for one particular transmission end (for example, cell A), the processor 430 may estimate locations of the transmission points corresponding to the transmission end (cell A).

According to an embodiment, the processor 430 may calculate a location estimation value when the number of transmission points is 1 based on equation (3) above, calculate location estimation values when the number of transmission points are 2 based on equation (5), and calculate location estimation values when the number of transmission points is m based on equation (6). As described above, the processor 430 may calculate the location estimation values based on an assumption of the number of transmission points, and determine the number and locations of transmission points corresponding to a maximum value among the calculated location estimation values as at least one transmission points and locations corresponding to the transmission end (cell A).

According to an embodiment, the processor 430 may configure a threshold value for the location estimation value. When the number of transmission points is 1, the processor 430 may compare the calculated location estimation value with a preset threshold value. When the calculated location estimation value is larger than or equal to the preset threshold value, the processor 430 may determine the number and locations of transmission points corresponding to the location estimation value as at least one transmission point corresponding to the transmission end. When the calculated location estimation value is smaller than the preset threshold value, the processor 430 may re-calculate location estimation values for at least one transmission points again while increasing the number of transmission points one by one and compare the re-calculated location estimation value with the preset threshold value. The processor 430 may repeatedly calculate the location estimation value while increasing the number of transmission points one by one until the re-calculated location estimation value becomes larger than or equal to the preset threshold. Various methods of estimating the locations of at least one transmission end or at least one transmission point corresponding to the transmission end by the processor 430 will be described in more detail with reference to FIGS. 10 to 12.

Referring back to FIG. 4, the external electronic device 402 may include elements for collecting information used for estimating locations of at least one transmission end (for example, base station) or a plurality of transmission points (for example, base station antennas) of the transmission end and reporting the collected information to the electronic device 401 and, to this end, may include at least one of the cellular module 450, the GPS module 460, the memory 470, the communication module 480, and the processor 490. The processor 490 may include some or all of the processor 120 illustrated in FIG. 1.

The cellular module 450 may transmit and receive data through at least one transmission end. For example, when a cell area managed by at least one transmission end (for example, base station or base station antenna) is a coverage of a 3GPP LTE system, the cellular module 450 may receive a mobile communication service of an LEP communication network through at least one accessed transmission end.

According to an embodiment, transmission end information received through at least one transmission end may include network information of the corresponding transmission end and measurement information measured by the corresponding transmission end. For example, the transmission end information received through at least one transmission end may include at least one piece of first transmission end information (for example, serving cell information) and second transmission end information (neighbor cell information).

According to an embodiment, the first transmission end information may include first network information and second measurement information, wherein the first network information may include, for example, information on at least one of a Mobile Country Code (MCC), a Mobile Network Code (MNC), a Tracking Area Code (TAC), a Global Cell Identifier (GCI), a Physical Cell Identifier (PCI), and an E-UTRA Absolute Radio Frequency Channel Number (EARFCN) and the first measurement information may include, for example, information on at least one of Received Signal Strength Indication (RSSI), Reference Signal Received Quality (RSRQ), Signal to Noise Ratio (SNR), Reference Signal Received Power (RSRP), and Time Advance (TA).

According to an embodiment, the second transmission end information may include second network information and second measurement information, wherein the second network information may include, for example, information on at least one of a PCI or an EARFCN and the second measurement information may include, for example, information on RARP.

The GPS module 460 may receive location information of the external electronic device 402 from a GPS satellite. The location information may include at least one of GPS longitude, GPS latitude, and GPS accuracy.

The memory 470 may store transmission end information received from at least one transmission end and location information at a point where the transmission end information is received, acquired from the GPS module 460. According to an embodiment, when the processor 490 wakes-up on every Discontinuous Reception (DRX) period, the external electronic device 402 may receive the transmission end information and the location information and store the received information in the memory 470.

The communication module 480 may serve to periodically or aperiodically transmit the collected information including the transmission end information and the location information to the electronic device 401. According to an embodiment, the communication module 480 may include Wi-Fi communication.

Although it has been described that the communication module 480 is the Wi-Fi communication module for the purpose of reporting the collected information for the problem of charging according to various embodiments of the present disclosure, the present disclosure is not limited thereto and the communication module 480 may include another communication module as well as the Wi-Fi communication module.

The processor 490 may generally control the external electronic device 402. According to an embodiment, the processor 490 may transmit and report the collected information to the electronic device 401 on a preset report period by controlling the communication module 480. For example, the preset report period may include a report period such as a maximum report period (maxReportInterval) or a minimum report period (minReportInterval).

According to an embodiment, when the processor 490 is Wi-Fi communication-connected to the communication module 420 of the electronic device 401 through the communication module 480, the processor 490 may report collected information including the transmission end information and the location information to the electronic device 401. For example, the processor 490 may determine whether the Wi-Fi connection is possible through the communication module 480 when a predetermined report period arrives. When the Wi-Fi connection is possible, the processor 490 may report the collected information through the Wi-Fi communication by the communication module 480. In contrast, when the Wi-Fi connection is not possible, the processor 490 may stand by without reporting the collected information until the next report period arrives.

According to various embodiments, an electronic device may include: a memory that stores grid information corresponding to a plurality of grids corresponding to a cell; and a processor, wherein the processor may be configured to acquire location information of an external electronic device and cell information related to a cell of the external electronic device corresponding to the location information, to calculate at least one active grid corresponding to the location information of the electronic device among the plurality of grids at least based on the location information, to acquire dominant values corresponding to the at least one active grid based on the cell information, to designate the at least one active grid as at least one dominant grid when the dominant values meet a predetermined condition, and to update the cell information when a number of at least one dominant grid meets a predetermined condition.

According to various embodiments, when the number of at least one dominant grid is smaller than the predetermined condition, the processor may be configured to determine that the cell has become extinct.

According to various embodiments, when the dominant value is smaller than the predetermined condition, the processor may be configured to change the dominant grid to the active grid.

According to various embodiments, an electronic device may include: a communication module; and a processor that collects transmission end information acquired from at least transmission one end and location information of a point where the transmission end information is acquired through the communication module by at least one external electronic device, generates a coverage map corresponding to the at least one transmission end based on the collected transmission end information and location information, and estimates locations of the at least one transmission end based on the generated coverage map.

According to various embodiments, the processor may be configured to perform quantization to map the location information to a plurality of grids divided to have a predetermined size and shape, to determine at least one active grid based on the transmission end information corresponding to the location information among the plurality of quantized grids, and to configure a coverage of the at least one transmission end to include the at least one determined active grid.

According to various embodiments, the processor may be configured to configure at least one candidate point among a plurality of grids included in the coverage, to calculate a location estimation value for each of the grids included in the coverage based on the at least one configured candidate point by using the transmission end information, and to estimate a candidate point having a maximum location estimation value among the calculated location estimation values as the location of the at least one transmission end.

According to various embodiments, the processor may be configured to calculate a distance rank between the at least one candidate point and each of the grids, to calculate a Timing Advance (TA) rank corresponding to each of the grids based on the transmission end information, and to calculate a correlation between the distance rank and the TA rank calculated for each of the grids.

According to various embodiments, the processor may be configured to calculate a distance rank between the at least one candidate point and each of the grids, to calculate a Timing Advance (TA) rank corresponding to each of the grids based on the transmission end information, and to calculate a correlation between the distance rank and the TA rank calculated for each of the grids as the location estimation value.

According to various embodiments, the processor may be configured to calculate a distance rank between the at least one candidate point and each of the grids, to calculate a Received Signal Strength Indicator (RSSI) rank corresponding to each of the grids based on the transmission end information, and to calculate a rank correlation between the distance rank and the RSSI rank calculated for each of the grids as the location estimation value.

According to various embodiments, the processor may be configured to calculate a location estimation value of each of n clusters corresponding to n candidate points and calculate matching values according to a combination of the n candidate points when a number of candidate points is n, and to estimate a candidate point having a maximum value among the calculated matching values as the location of the at least one transmission end.

According to various embodiments, the processor may be configured to configure a threshold value for matching values according to a combination of the at least one candidate point, to calculate matching values according to the combination of at least one candidate points based on a number of at least one candidate points, and to estimate the at least one candidate point corresponding to the calculated matching value as the location of the at least one transmission end when the calculated matching value is larger than or equal to the threshold value.

According to various embodiments, the processor may be configured to determine and register at least one dominant grid among the at least one determined active grid, to update the number of at least one registered dominant grids according to whether the transmission end information is received from the at least one transmission end, and to determine whether the at least one transmission end has become extinct based on a ratio of the number of updated dominant grids to the number of registered dominant grids.

According to various embodiments, the processor may be configured to determine active grids occupied by a plurality of transmission ends among the at least one determined active grid as dominant grids, to increase dominant values corresponding to the determined dominant grids at a predetermined rate when the transmission end information is received from the at least one transmission end, and to register the corresponding active grids as the dominant grids when the increased dominant values are larger than or equal to a threshold value.

According to various embodiments, the processor may be configured to perform a normalization to make a sum of the dominant values corresponding to the at least one determined dominant grid 1, to update the dominant values of the corresponding dominant grids when the transmission end information corresponding to the at least one dominant grid is received from the at least one transmission end, to release the dominant grids when the updated dominant values are equal to or smaller than a threshold value, and to update the number of registered dominant grids based on the released dominant grids.

According to various embodiments, when the ratio of the number of updated dominant grids to the number of registered dominant grids is equal to or smaller than a threshold value, the processor may be configured to determine that the coverage corresponding to the corresponding transmission end has become extinct.

Figure 10:
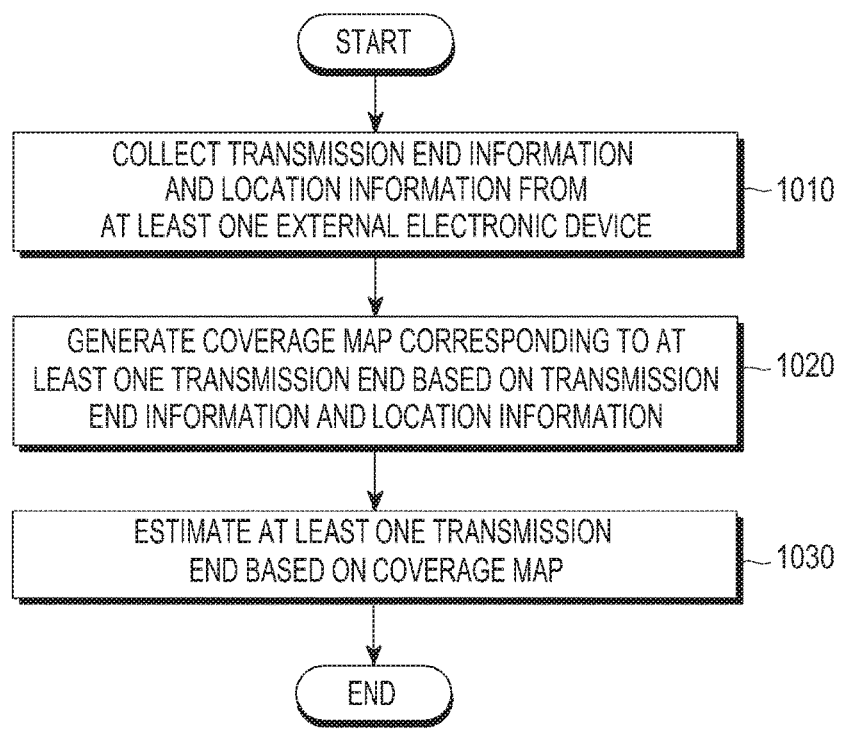
FIG. 10 is a flowchart illustrating a method of estimating locations of at least one transmission end by the electronic device according to various embodiments.

FIG. 10 is flowchart illustrating an operation of a method of estimating a location of at least one transmission end by an electronic device according to various embodiments. The method may include operation 1010 to operation 1030. The method of estimating locations of at least one transmission end by the electronic device may be performed by one of the electronic device (for example, the server 106 or the electronic device 401) and the processor (for example, the processor 120 or the processor 430) of the electronic device.

In operation 1010, for example, the electronic device may collect transmission end information acquired by at least one external electronic device (for example, mobile terminal) from at least one transmission end (for example, base station or base station antenna) and location information at a point where the transmission end information is acquired from at least one external electronic device.

According to an embodiment, the transmission end information may include at least one piece of first transmission end information corresponding to a serving cell and second transmission end information corresponding to a neighbor cell. Further, the location information may include location information of the corresponding external electronic device at the point where at least one piece of the first and second transmission end information is acquired. According to an embodiment, the location information may be acquired through the GPS module of the corresponding external electronic device.

According to an embodiment, the first transmission end information may include first network information and first measurement information. For example, the first network information may include information on at least one of an MCC, an MNC, a TAC, a Cell ID (global cell ID), a PCI (Physical Cell ID), and an EARFCN, and the first measurement information may include information at least one of RSSI, RSRQ, SNR, RSRP, and Time Advance (TA).

According to an embodiment, the second transmission end information may include second network information and second measurement information. For example, the second network information may include information on at least one of a PCI (Physical Cell ID) and an EARFCN, and the second measurement information may include information on RSRP.

According to an embodiment, the location information may include information on at least one of a time stamp for time information, longitude information, latitude information, and location error information (GPS accuracy). The time information may include a time at a time point when at least one piece of the first transmission end information and the second transmission end information is acquired. The longitude information and the latitude information may include location information on a location where at least one piece of the first transmission end information and the second transmission end information is acquired.

In operation 1020, for example, the electronic device may generate a coverage map corresponding to at least one transmission end based on the collected transmission end information and location information.

According to an embodiment, the electronic device may perform quantization to map the collected location information to a plurality of grids divided to have a predetermined size and shape. The electronic device may determine at least one active grid based on the transmission end information corresponding to the location information among the plurality of quantized grids. The electronic device may configure a coverage of at least one transmission end to include at least one determined active grid. Accordingly, the electronic device may generate the coverage map including at least one coverage configured for each of at least one transmission end.

In operation 1030, for example, the electronic device may estimate locations of at least one transmission end based on the generated coverage map.

According to an embodiment, the electronic device may configure at least one candidate points among the plurality of grids included in the coverage. The electronic device may calculate a location estimation value of each grid included in the coverage based on at least one configured candidate by using the transmission end information. The electronic device may estimate candidate points having a maximum value among the calculated location estimation values as the locations of at least one transmission end. The calculation of the location estimation value may be performed using equation (3) to equation (6) as described in FIGS. 6 to 9B. Accordingly, a detailed description thereof will be replaced with the above description.

Figure 11:
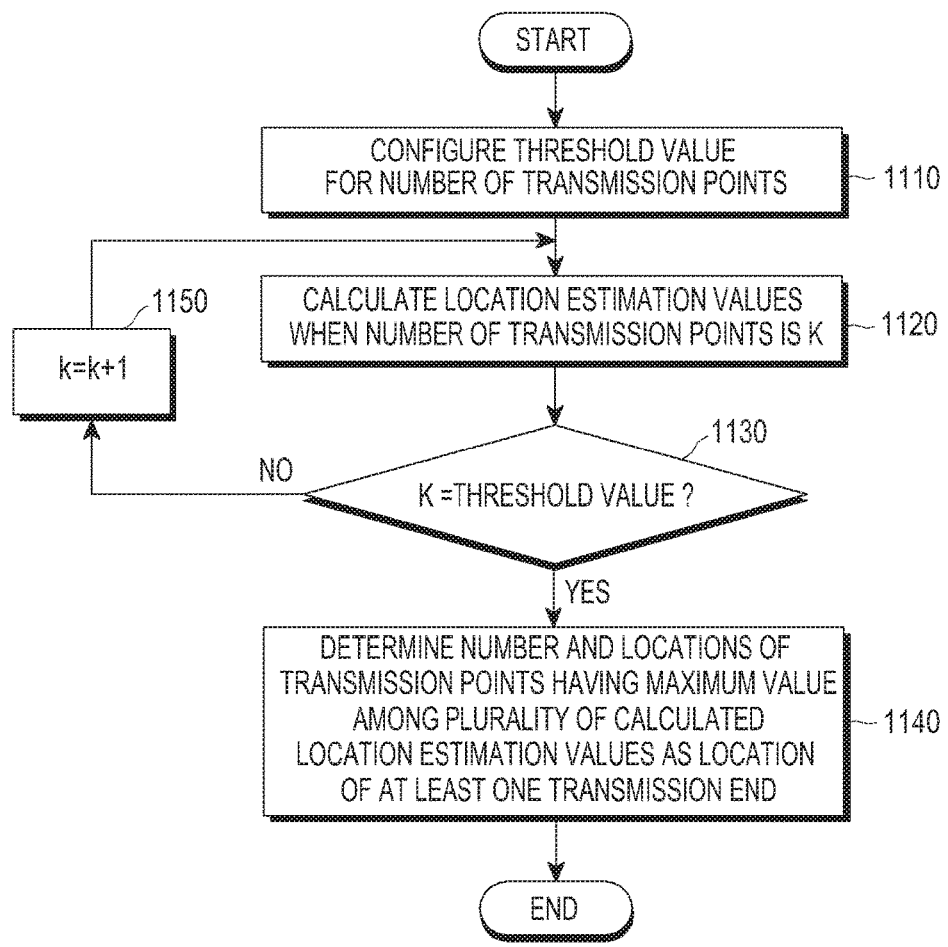
FIG. 11 is a flowchart illustrating a method of estimating locations of at least one transmission end by the electronic device according to various embodiments.
Figure 12:
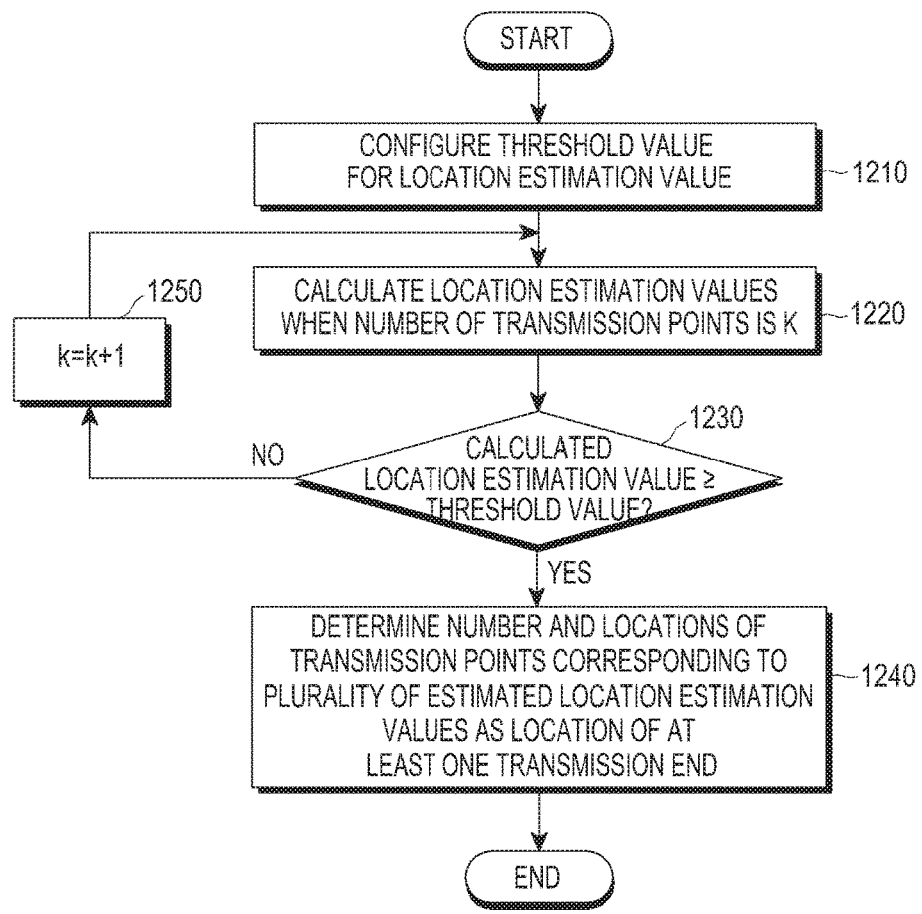
FIG. 12 is a flowchart illustrating an operation of a method of estimating locations of at least one transmission end by an electronic device according to various embodiments.

According to an embodiment, even when the electronic device cannot know the number of at least one transmission point corresponding to at least one transmission end, the electronic device may estimate the number and locations of at least one transmission point corresponding to at least one transmission end. For example, the electronic device may estimate the number and locations of at least one transmission point by configuring in advance the number of at least one transmission point or the calculated location estimation values. Referring to FIGS. 11 and 12, a method of estimating the number and locations of at least one transmission point when the electronic device cannot know the number of at least one transmission point corresponding to at least one transmission end will be described below.

FIG. 11 is a flowchart illustrating a method of estimating locations of at least one transmission end by the electronic device according to various embodiments. FIG. 11 is a flowchart illustrating in detail a method of estimating locations of at least one transmission end in operation 1030 of FIG. 10, and the method may include operation 1110 to operation 1150. The method of estimating the locations of at least one transmission end by the electronic device may be performed by one of the electronic device (for example, the server 106) and the processor (for example, the processor 120 or the processor 430) of the electronic device.

In operation 1110, for example, the electronic device may configure in advance a threshold value for the number of at least one transmission point to estimate the number and locations of at least one transmission point corresponding to at least one transmission end.

In operation 1120, for example, the electronic device may calculate location estimation values when the number of transmission points is k based on equation (1) to equation (4). The number of transmission points and the location estimation values calculated in accordance with the number may be temporarily stored in the memory of the electronic device.

In operation 1130, for example, the electronic device may determine whether the number (k) of at least one transmission point is equal to the preset threshold value. The electronic device may perform operation 1140 when the number (k) of transmission points is equal to the threshold value in operation 1130, and perform operation 1150 when the number (k) of transmission points is not equal to the threshold value.

In operation 1140, for example, the electronic device may determine a location estimation value having a maximum value among the calculated location estimation values as the number and locations of at least one transmission point. For example, the electronic device may determine, as the number and locations of at least one transmission point, a location estimation value having a maximum value among a first location estimation value in a case where the number (k) of transmission points calculated using equation (3) above is 1, a second location estimation value in a case where the number (k) of transmission points calculated using equation (4) and equation (5) above is 2, and a third location estimation value in a case where the number (k) of transmission points calculated using equation (4) and equation (6) above is 3. For example, when the third location estimation value is the largest among the calculated first to third location estimation values, the number of at least one transmission point is 3 and coordinates of three candidate points corresponding to the location estimation value may be determined as the locations of at least one transmission point.

In operation 1150, for example, after increasing the number (k) of at least one transmission point one by one, the electronic device may repeat operation 1120 to calculate again the location estimation value corresponding to the increased number.

FIG. 12 is a flowchart illustrating an operation of a method of estimating a location of at least one transmission end by an electronic device according to various embodiments. FIG. 11 is a flowchart illustrating in detail a method of estimating the location of at least one transmission end in operation 1030 of FIG. 10, and the method may include operation 1210 to operation 1250. The method of estimating the location of at least one transmission end may be performed by one of the electronic device (for example, the server 106) and the processor (for example, the processor 120 or the processor 430) of the electronic device.

In operation 1210, for example, the electronic device may configure, in advance, a threshold value for location estimation values of at least one transmission point to estimation the number and locations of at least one transmission point corresponding to at least one transmission end.

In operation 1220, for example, the electronic device may calculate location estimation values when the number of transmission points is k based on equation (3) to equation (6). The number of transmission points and the location estimation values calculated in accordance with the number may be temporarily stored in the memory of the electronic device.

In operation 1230, for example, the electronic device may determine whether the calculated location estimation value is larger than or equal to the preset threshold value. When the calculated location estimation value is larger than or equal to the threshold value in operation 1230, the electronic device may perform operation 1240. When the calculated location estimation value is smaller than the threshold value, the electronic device may perform operation 1250.

In operation 1240, for example, the electronic device may determine the number and locations of transmission points corresponding to the calculated location estimation values as the number and locations of at least one transmission point. For example, when the electronic device configures the threshold value as 0.8, the electronic device may assume that a first location estimation value is 0.5 when the number (k) of transmission points calculated using equation (3) above is 1, a second location estimation value is 0.6 when the number (k) of transmission points calculated using equation (4) and equation (5) above is 2, and a third location estimation value is 0.9 when the number (k) of transmission points calculated using equation (4) and equation (6) is 3. In this case, the electronic device may determine the number and locations of transmission points corresponding to the third location estimation value which is larger than or equal to the threshold value (for example, 0.8) among the calculated location estimation values as the number and locations of at least one transmission point.

In operation 1150, for example, after increasing the number (k) of at least one transmission point one by one, the electronic device may repeat operation 1420 to calculate again the location estimation value corresponding to the increased number.

Referring back to FIG. 4, as described above, the processor 430 may generate a coverage map for each transmission end based on transmission end point and location information collected from at least one external electronic device and estimate the number and location of at least one transmission point for at least one transmission end based on the generated coverage map. The estimated number and locations of at least one transmission points may be provided to at least one external electronic device and used as a reference location for estimating the location of the external electronic device.

According to an embodiment, after estimating the number and locations of at least one transmission point for at least one transmission end based on the generated coverage map, the processor 430 may determine effectiveness of the coverage corresponding to at least one estimated transmission point. When the coverage corresponding to at least one estimated transmission point is not effective, the processor 430 may determine that the corresponding transmission point has become extinct. Accordingly, the electronic device 401 may efficiently manage the coverage map including coverage information generated in accordance with at least one transmission end.

According to an embodiment, the processor 430 may determine at least one dominant grid among at least one active grid within the coverage in order to determine whether the coverage corresponding to at least one estimated transmission point is effective. The dominant grid will be described with reference to FIGS. 13A and 13B.

Figure 13A:
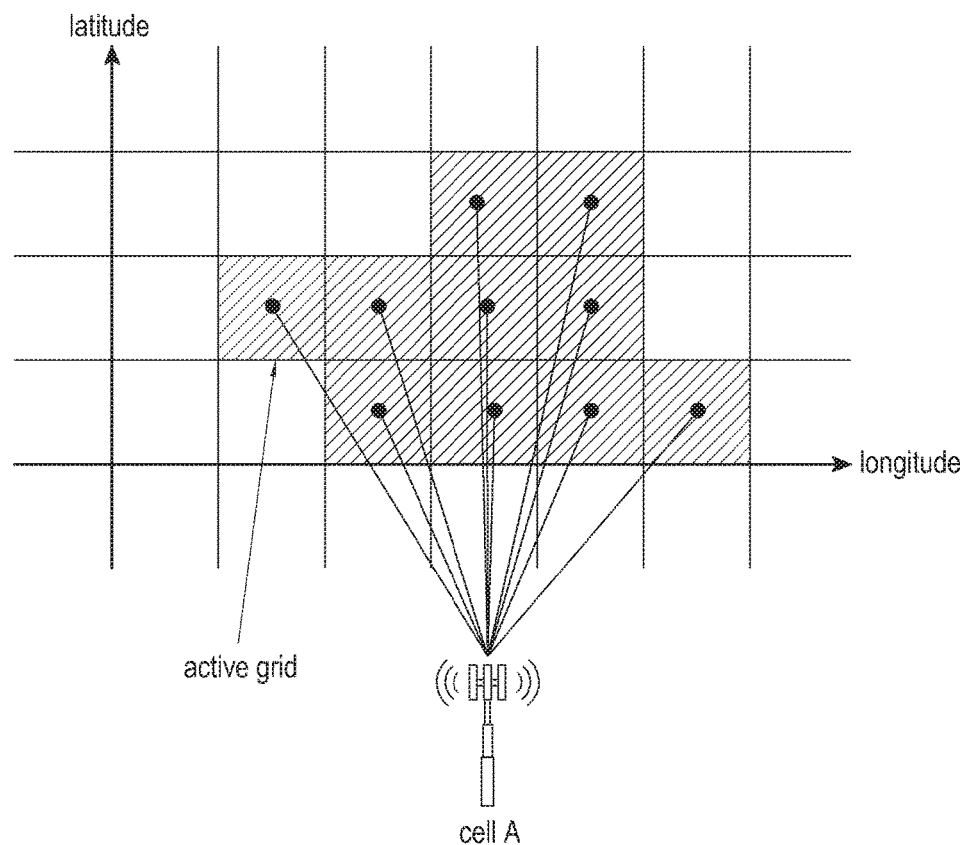
FIG. 13A illustrates an example of active grids of a coverage corresponding to one particular transmission end in an electronic device according to various embodiments.

FIG. 13A illustrates an example of active grids of a coverage corresponding to one particular transmission end in an electronic device according to various embodiments, and FIG. 13 illustrates an example of dominant grids of a coverage corresponding to one particular transmission end in an electronic device according to various embodiments.

Referring to FIG. 13A, one particular transmission end (for example, cell A) may acquire transmission end information from a plurality of external electronic devices 402 located at a plurality of points and a grid corresponding to a point where the transmission end information is acquired may be the active grid for the transmission end (cell A), which may become the coverage of the transmission end. For example, the coverage (cell A) corresponding to the transmission end (cell A) may include a plurality of active grids.

Figure 13B:
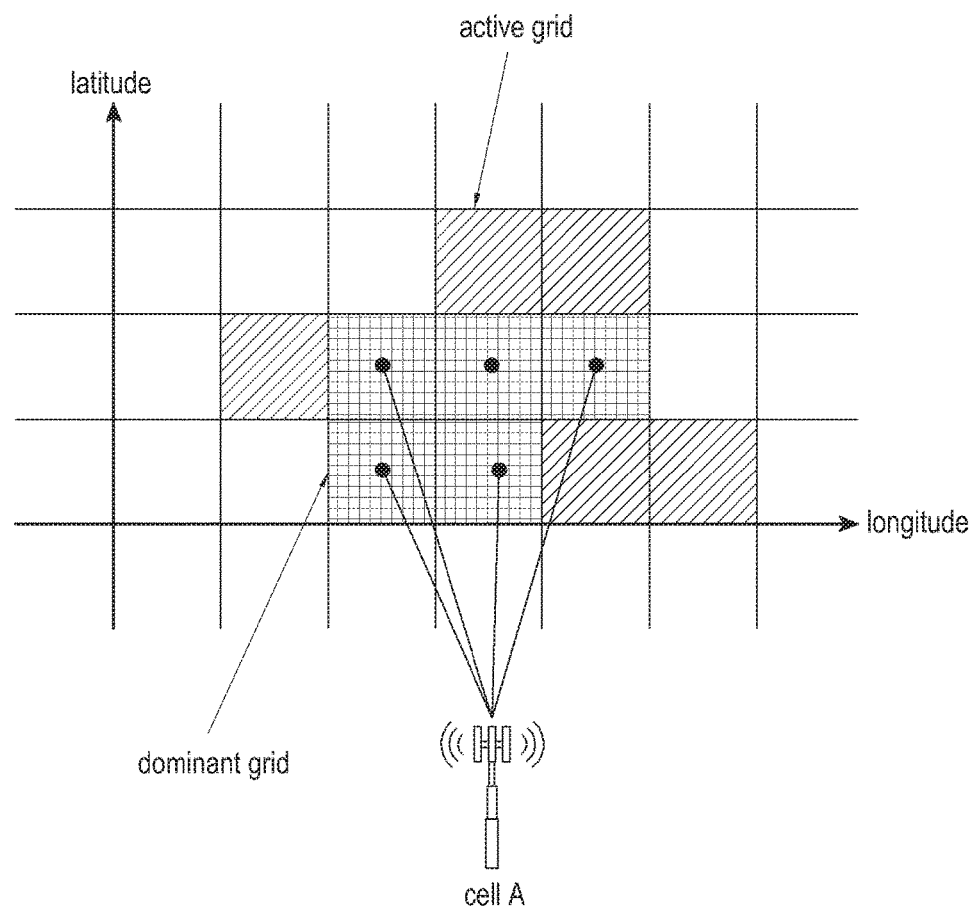
FIG. 13B illustrates an example of dominant grids of a coverage corresponding to one particular transmission end in an electronic device according to various embodiments.

Referring to FIG. 13B, the grids illustrated in FIG. 13B may be active grids by at least one other transmission end as well as the transmission end (cell A) among the plurality of active grids for the transmission end (cell A) as illustrated in FIG. 13A. As described above, active grids that are more frequently measured by at least one transmission end among the plurality of active grids may be defined as the dominant grids. For example, whenever transmission end information and location information acquired from at least one external electronic device are collected, one active grid may increase a dominant value by a preset value (A), and a sum thereof may be normalized to be 1. For example, when coverage information (that is, transmission end information) is collected and a dominant value corresponding to the corresponding coverage is αj, the updated dominant value may be as shown in equation (7).

$$\alpha_j \leftarrow \alpha_j + \Delta \qquad (7)$$

In equation (7), Δ denotes a constant value increasing whenever the corresponding coverage is collected, and this value may be preset.

The processor 430 may normalize a sum of dominant values by a plurality of transmission ends corresponding to the corresponding active grids to be 1 in order to indicate the percentage (or ratio) which the dominant values of one transmission end (for example, cell A) hold within the corresponding active grids, and this may be expressed by equation (8) below.

$$\alpha_i \leftarrow \frac{\alpha_i}{\alpha_i + \alpha_2 + \cdots + \alpha_N} \qquad (8)$$

In equation (8), i denotes a location index of each cell among a plurality of grids, and the above process may be performed for all grids.

After the normalization, when the dominant value of one transmission end (for example, cell A) corresponding to the corresponding active grid is larger than or equal to a threshold value, the processor 430 may register the corresponding active grid as a new dominant grid of the corresponding transmission end (cell A). In contrast, when the dominant value of the registered dominant grid of the corresponding transmission end (cell A) is equal to or smaller than the threshold, the processor 430 may release the registration of the corresponding dominant grid. When the active grid is registered as the dominant grid of the corresponding transmission end, the processor 430 may update the dominant value of the corresponding dominant grid of the corresponding transmission end whenever transmission end information and location information corresponding to each dominant grid are collected from at least one external electronic device.

As described above, whenever the transmission end information of the predetermined coverage (cell A) is collected, the processor 430 may register the dominant grid and release the registration by calculating the dominant value of the corresponding dominant grid. The processor 430 may calculate a ratio between the number of initially registered dominant grids within the coverage of one transmission end (for example, cell A) and the number of dominant grids after the update and, when the ratio is equal to or smaller than a threshold value, determine that the corresponding coverage (cell A) has become extinct. When it is determined that the coverage has extinct, the processor 430 may remove the corresponding coverage from the cell database 412 or the grid database 414. The dominant value corresponding to each dominant grid will be described with reference to FIGS. 14a to 14E.

FIGS. 14A to 14E illustrate examples of dominant grids having dominant values according to various embodiments.

Figure 14A:
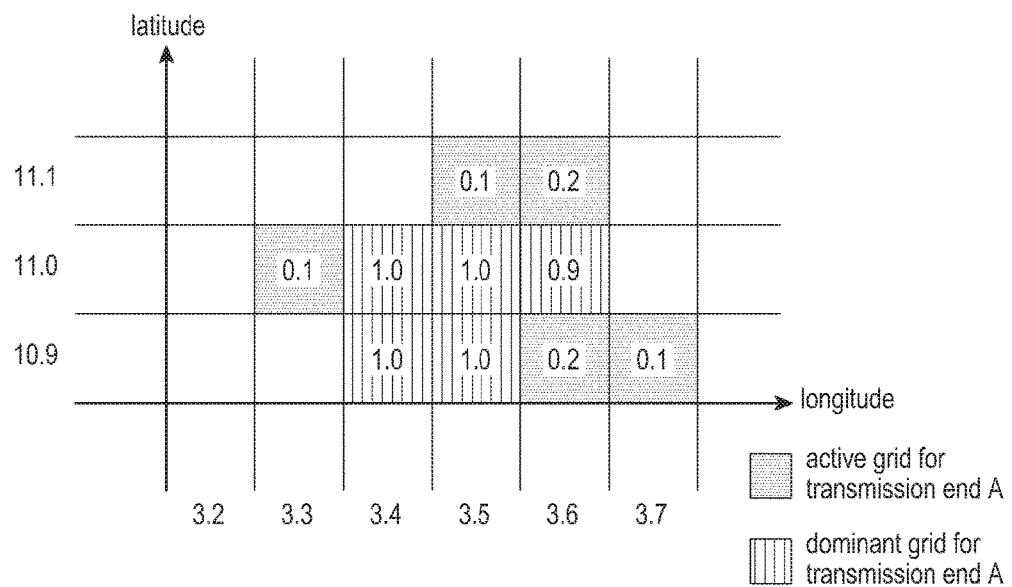
FIGS. 14A to 14E illustrate examples of dominant grids having dominant values according to various embodiments.

Referring to FIG. 14A, 5 dominant grids of a plurality of active grids within the coverage of the transmission end (for example, cell A) are illustrated. For example, coordinates of the 5 dominant grids may be (3.4, 11.7), (3.5, 11.7), (3.4, 11.8), (3.5, 11.8), and (3.6, 11.8). A number in the dominant grid may indicate a dominant value of the corresponding dominant grid of the transmission end (cell A).

Figure 14B:
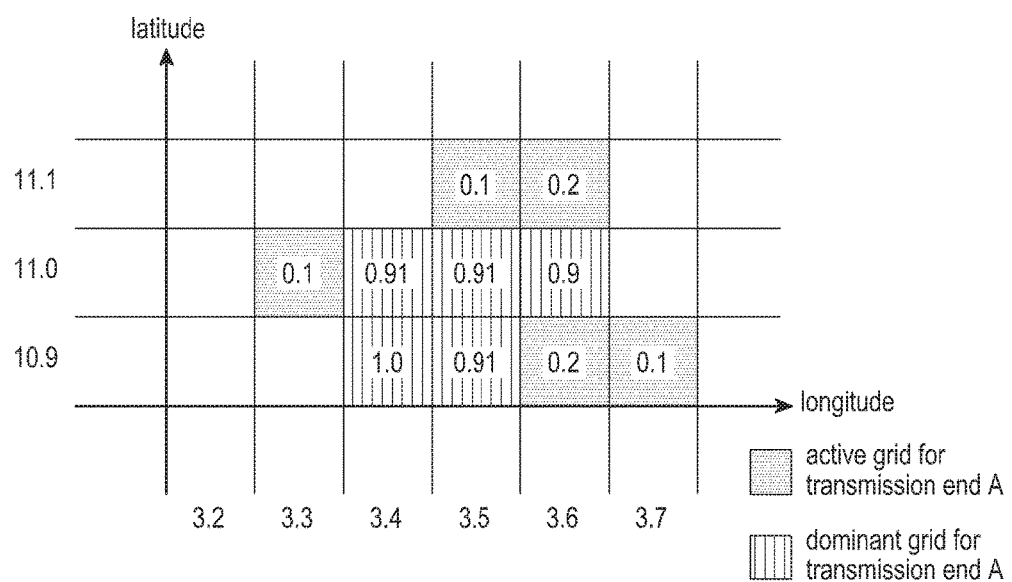

Referring to FIG. 14B, a change in the dominant value for the coverage of the transmission end (cell A) after information on the coverage of the transmission end (cell B) is collected is illustrated. For example, each of the coordinates (3.5, 11.7), (3.4, 11.8), and (3.5, 11.8) of the dominant grids for the coverage of the transmission end (cell A) are changed from 1.0 to 0.91. It is assumed that a constant value (A) that increases whenever the information on the coverage of the transmission end (cell A) is collected is 0.1. The constant value (A) may be preset by the processor 430. The updated dominant value of the corresponding dominant grid may be calculated using equation (9) below.

$$\alpha_B \leftarrow 0$$
$$\alpha_B \leftarrow \alpha_B + 0.1$$
$$\alpha_B \leftarrow \frac{\alpha_B}{\alpha_A + \alpha_B} = \frac{0.1}{1.1} \tag{9}$$

In equation (9), $\alpha_B$ denotes a dominant value for the coverage of transmission end B, and $\alpha_A$ denotes a dominant value for the coverage of transmission end A.

Referring to equation (9) above, the dominant value for the coverage of transmission end B may be initially configured as "0" as shown in the first equation of equation (9). Thereafter, when the information on the coverage of the corresponding transmission end (cell B) is collected, $\alpha_B$ may be updated by adding 0.1, which is preset as the constant value ($\Delta$), as shown in the second equation of equation (9). Such a process may be equally performed for the coverage of the transmission end (for example, cell A). As described above, the updated dominant value $\alpha_B$ for one transmission end (for example, cell B) of the plurality of transmission end s (for example, cell A and cell B) whenever the information on the coverage of the plurality of transmission ends (for example, cell A and cell B) is collected may be calculated using the third equation of equation (9).

Figure 14C:
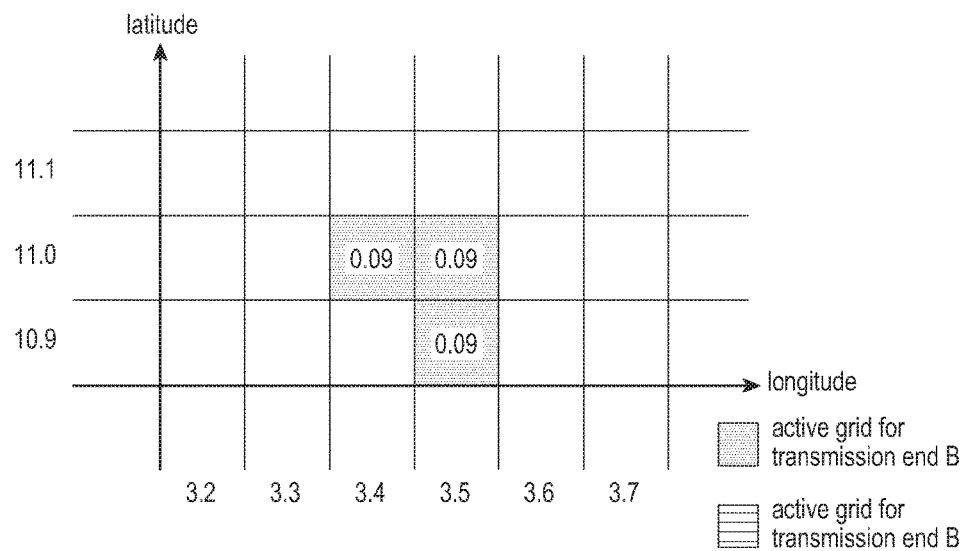

Referring to FIG. 14C, active grids and dominant values for the coverage of the transmission end (cell B) are illustrated. Similarly, the coverage of the transmission end (cell B) may include active grids having the same coordinates as those of the active grids of the transmission end (cell A). For example, the active grids having the same coordinates as those of the active grids of the transmission end (cell A) may include coordinates (3.4, 11.8), (3.5, 11.8), and (3.5, 11.7).

Figure 14D:
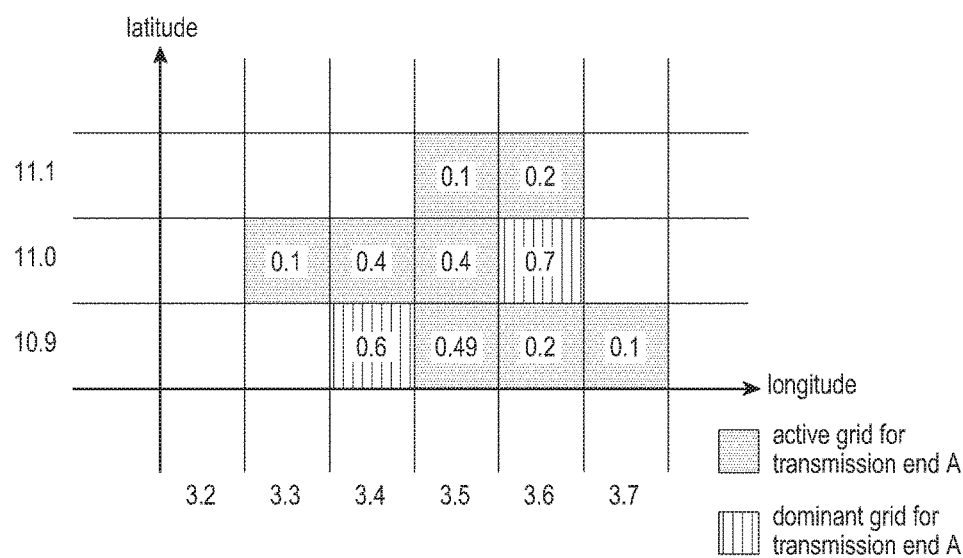

Referring to FIG. 14D, dominant values of the coverage of the transmission end (B) after the information on the coverage of the transmission end (cell B) illustrated in FIG. 14C is collected are illustrated. It may be noted that dominant grids within the coverage of the transmission end (cell A) after the information on the coverage of the transmission end (cell B) are reduced from 5 dominant grids registered as the dominant grids in FIG. 14A to 2 dominant grids as illustrated in FIG. 14D after the information on the coverage for the transmission end (cell B) is collected.

According to an embodiment, when a ratio of dominant grids indicating a ratio between the number of registered dominant grids and the number of updated dominant grids is equal to or smaller than a preset threshold value, the processor 430 may determine that the corresponding transmission end has become extinct. For example, when the number of registered dominant grids for the transmission end (cell A) is 5 as illustrated in FIG. 14B and the updated number of dominant grids within the coverage of the transmission end (cell A) after the collection of the information on the coverage of the transmission end (cell A) after the collection of the information on the coverage of the transmission end (cell B) is reduced to be 2 as illustrated in FIG. 14D, the processor 430 may determine that the coverage of the transmission end (cell A) has become extinct since the ratio of dominants is equal to or smaller than the preset threshold vale (for example, 0.5).

Figure 14E:
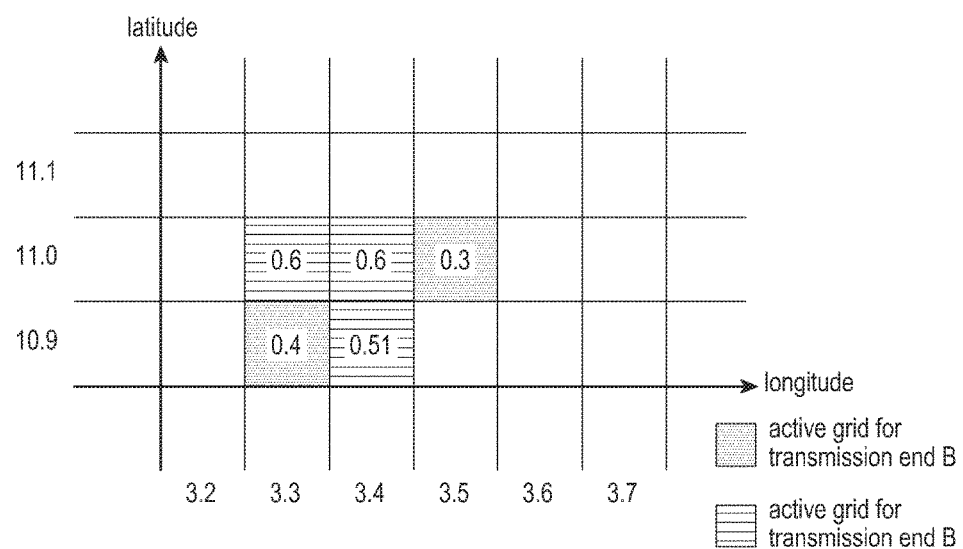

Referring to FIG. 14E, with respect to the transmission end (cell B) in FIG. 14C, the updated active grids, the dominant grids, and the dominant values within the coverage of the transmission end (cell B) after the information on the coverage of the transmission end (cell B) is collected are illustrated. For example, when the collection of the information on the coverage of the transmission end (cell B) is updated, dominant values of active grids of three coordinates (3.4, 11.8), (3.5, 11.8), and (3.5, 11.7) illustrated in FIG. 14C may increase and thus the active grids of the corresponding coordinates may be registered as the dominant grids.

According to an embodiment, the processor 430 may determine whether the corresponding transmission point has become extinct by determining effectiveness of at least one transmission point. A method of determining whether the corresponding transmission point has become extinct by determining the effectiveness of at least one transmission point will be described in detail with reference to FIG. 15.

Figure 15:
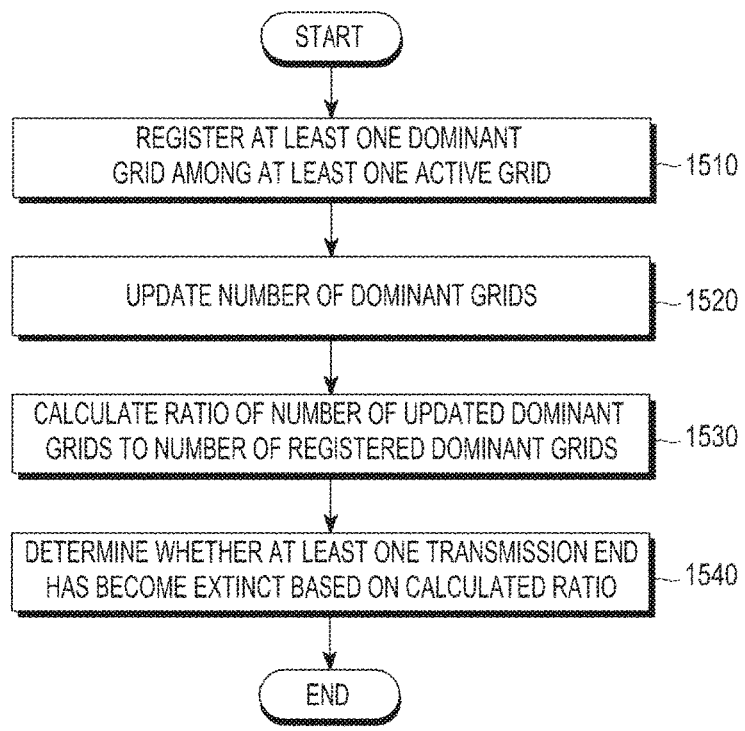
FIG. 15 is a flowchart illustrating an operation of a method of determining whether at least one transmission point has become extinct by an electronic device according to various embodiments.

FIG. 15 is a flowchart illustrating an operation of a method of determining whether at least one transmission point has become extinct by an electronic device according to various embodiments. The method may include operation 1510 to operation 1540. The method of estimating the location of at least one transmission end may be performed by one of the electronic device (for example, the server 106) and the processor (for example, the processor 120 or the processor 430) of the electronic device.

In operation 1510, for example, the electronic device may determine and register at least one dominant grid among at least one active grid within the coverage corresponding to one particular transmission end (cell A).

According to an embodiment, the electronic device may determine active grids occupied by a plurality of transmission ends among at least one active grid within the coverage corresponding to the particular transmission end (cell A) as dominant grids within the coverage corresponding to the transmission end (cell A).

According to an embodiment, when transmission end information is received from at least one transmission end, dominant values corresponding to the determined active grids within the coverage of the transmission end (cell) may increase at a constant rate. According to an embodiment, when the increased dominant value is larger than or equal to a threshold value, the electronic device may register the corresponding active grids as the dominant grids within the coverage of the transmission end (cell A).

In operation 1520, for example, the electronic device may update the number of at least one registered dominant grid within the coverage of the transmission end (cell) according to whether the transmission end information is received from at least one transmission end.

According to an embodiment, the electronic device may normalize a sum of the dominant values corresponding to at least one determined dominant grids within the coverage of the transmission end (cell A) to be 1. For example, the normalization may be performed using equation (7) and equation (8).

According to an embodiment, when the transmission end information corresponding to at least one dominant grid is received from at least one transmission end, the electronic device may update dominant values of the corresponding dominant grids.

According to an embodiment, when the updated dominant value is equal to or smaller than threshold value, the electronic device may release the registration of the dominant grids.

According to an embodiment, the electronic device may update the number of registered dominant grids based on the released dominant grids within the coverage of the transmission end (cell A).

In operation 1530, for example, the electronic device may calculate a ratio of the number of updated dominant grids to the number of registered dominant grids within the coverage of the transmission end (cell A).

In operation 1540, for example, the electronic device may determine whether the transmission end (cell A) has become extinct based on the calculated dominant ratio.

According to an embodiment, when the dominant ratio of the number of updated dominant grids to the number of registered dominant grids is equal to or smaller than the threshold value, the electronic device may determine that the coverage corresponding to the corresponding transmission end (cell A) has become extinct.

According to various embodiments, a method of estimating a location by an electronic device may include: an operation of collecting transmission end information acquired from at least one transmission end and location information of a point where the transmission end information is acquired through the communication module by at least one external electronic device; an operation of generating a coverage map corresponding to the at least one transmission end based on the collected transmission end information and location information; and an operation of estimating locations of the at least one transmission end based on the generated coverage map.

According to various embodiments, the operation of generating the coverage map may include: an operation of quantizing to map the location information to a plurality of grids divided to have a predetermined size and shape; an operation of determining at least one active grid based on the transmission end information corresponding to the location information among the plurality of quantized grids; and an operation of configuring a coverage of the at least one transmission end to include the at least one determined active grid.

According to various embodiments, the operation of estimating the location of the at least one transmission end may include: an operation of configuring at least one candidate point among a plurality of grids included in the coverage; an operation of calculating location estimation values for the grids included in the coverage based on the at least one configured candidate point by using the transmission end information; and an operation of estimating a candidate point having a maximum value of the calculated location estimation values as a location of the at least one transmission end.

According to various embodiments, the operation of calculating the location estimation values for the grids included in the coverage may include: an operation of calculating a distance rank between the at least one candidate point and each of the grids; an operation of calculating a Timing Advance (TA) rank corresponding to each of the grids based on the transmission end information; and an operation of calculating a correlation between the distance rank and the TA rank calculated for each of the grids and configuring the calculated rank correlation and configuring the correlation as the location estimation value.

According to various embodiments, the operation of calculating the location estimation values for the grids included in the coverage may include: an operation of calculating a distance rank between the at least one candidate point and each of the grids; an operation of calculating a Timing Advance (TA) rank corresponding to each of the grids based on the transmission end information; and an operation of calculating a correlation between the distance rank and the TA rank calculated for each of the grids as the location estimation value.

According to various embodiments, the operation of calculating the location estimation values for the grids included in the coverage may include: an operation of calculating a distance rank between the at least one candidate point and each of the grids; an operation of calculating a Received Signal Strength Indicator (RSSI) rank corresponding to each of the grids based on the transmission end information; an operation of calculating a correlation between the distance rank and the RSSI rank calculated for each of the grids as the location estimation value.

According to various embodiments, the method of estimating the location by the electronic device may further include: an operation of calculating a location estimation value of each of n clusters corresponding to n candidate points and calculate matching values according to a combination of the n candidate points when a number of candidate points is n; and an operation of estimating a candidate point having a maximum value among the calculated matching values as the location of the at least one transmission end.

According to various embodiments, the method of estimating the location by the electronic device may further include: an operation of configuring a threshold value for matching values according to a combination of the at least one candidate point; an operation of calculating matching values according to the combination of at least one candidate points based on a number of at least one candidate points; and an operation of estimating the at least one candidate point corresponding to the calculated matching value as the location of the at least one transmission end when the calculated matching value is larger than or equal to the threshold value.

According to various embodiments, the method of estimating the location by the electronic device may further include: an operation of determining and registering register at least one dominant grid among the at least one determined active grid; an operation of updating the number of at least one registered dominant grids according to whether the transmission end information is received from the at least one transmission end; and an operation of determining whether the at least one transmission end has become extinct based on a ratio of the number of updated dominant grids to the number of registered dominant grids.

According to various embodiments, the operation of registering the at least one dominant grid may include: an operation of determining active grids occupied by a plurality of transmission ends among the at least one determined active grid as dominant grids; an operation of increasing dominant values corresponding to the determined dominant grids at a predetermined rate when the transmission end information is received from the at least one transmission end; and an operation of registering the corresponding active grids as the dominant grids when the increased dominant values are larger than or equal to a threshold value.

According to various embodiments, the operation of updating the number of at least one registered dominant grid comprises: an operation of performing a normalization to make a sum of the dominant values corresponding to the at least one determined dominant grid 1; an operation of updating the dominant values of the corresponding dominant grids when the transmission end information corresponding to the at least one dominant grid is received from the at least one transmission end; an operation of releasing the dominant grids when the updated dominant values are equal to or smaller than a threshold value; and an operation of updating the number of registered dominant grids based on the released dominant grids.

According to various embodiments, the operation of determining whether the at least one transmission end has become extinct may include an operation of, when the ratio of the number of updated dominant grids to the number of registered dominant grids is equal to or smaller than a threshold value, determining that the coverage corresponding to the corresponding transmission end has become extinct.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Furthermore, some operations may be executed in a different order or may be omitted, or other operations may be added.

According to various embodiments, a storage medium having instructions stored therein is provided. The instructions may be configured to cause, when executed by at least one processor, the processor to perform at least one operation. The at least one operation may include: an operation of collecting transmission end information acquired from at least one transmission end and location information of a point where the transmission end information is acquired through the communication module by at least one external electronic device; an operation of generating a coverage map corresponding to the at least one transmission end based on the collected transmission end information and location information; and an operation of estimating locations of the at least one transmission end based on the generated coverage map.

Although the present disclosure has been described with an exemplary embodiment, various changes and modifications may be suggested to one skilled in the art. It is intended that the present disclosure encompass such changes and modifications as fall within the scope of the appended claims.

What is claimed is:
1. An electronic device comprising:
a memory configured to store grid information corresponding to a plurality of grids corresponding to a cell; and
a processor,
wherein the processor is configured to:
acquire location information of an external electronic device and cell information related to a cell of the external electronic device corresponding to the location information,
calculate at least one active grid corresponding to the location information of the electronic device among the plurality of grids at least based on the location information, to acquire dominant values corresponding to the at least one active grid based on the cell information,
designate the at least one active grid as at least one dominant grid when the dominant values meet a predetermined condition, and
update the cell information when a number of at least one dominant grid meets a predetermined condition.

2. The electronic device of claim 1, wherein, when the number of at least one dominant grid is smaller than the predetermined condition, the processor is configured to determine that the cell has become extinct.

3. The electronic device of claim 1, wherein, when a dominant value is smaller than the predetermined condition, the processor is configured to change the dominant grid to the active grid.

4. An electronic device comprising:
a communication module; and
a processor configured to:
collect transmission end information acquired from at least one transmission end and location information of a point where the transmission end information is acquired through the communication module by at least one external electronic device,
generate a coverage map corresponding to the at least one transmission end based on the collected transmission end information and location information, the coverage map including a plurality of grids divided into a predetermined size and shape,
estimate locations of the at least one transmission end based on the generated coverage map, and
determining whether a coverage corresponding to the at least one transmission end in the generated coverage has been extinct based on a change in a number of at least one dominant grid corresponding to the coverage among the plurality of grids.

5. The electronic device of claim 4, wherein the processor is configured to:
perform quantization to map the location information to the plurality of grids,
determine at least one active grid based on the transmission end information corresponding to the location information among the plurality of quantized grids, and
configure the coverage of the at least one transmission end to include the at least one determined active grid.

6. The electronic device of claim 4, wherein the processor is configured to:
configure at least one candidate point among a plurality of grids included in the coverage,
calculate a location estimation value for each of the grids included in the coverage based on the at least one configured candidate point by using the transmission end information, and
estimate a candidate point including a maximum location estimation value among the calculated location estimation values as a location of the at least one transmission end.

7. The electronic device of claim 6, wherein the processor is configured to:
calculate a distance rank between the at least one candidate point and each of the grids,
calculate a Timing Advance (TA) rank corresponding to each of the grids based on the transmission end information, and
calculate a rank correlation between the distance rank and the TA rank calculated for each of the grids and configure the calculated rank correlation as the location estimation value.

8. The electronic device of claim 6, wherein the processor is configured to:
calculate a distance rank between the at least one candidate point and each of the grids,
calculate a Received Signal Strength Indicator (RSSI) rank corresponding to each of the grids based on the transmission end information, and
calculate a rank correlation between the distance rank and the RSSI rank calculated for each of the grids as the location estimation value.

9. The electronic device of claim 6, wherein the processor is configured to:
calculate a location estimation value of each of n clusters corresponding to n candidate points and calculate matching values according to a combination of the n candidate points when a number of candidate points is n, and
estimate a candidate point including a maximum value among the calculated matching values as a location of the at least one transmission end.

10. The electronic device of claim 6, wherein the processor is configured to:
configure a threshold value for matching values according to a combination of the at least one candidate point,
calculate matching values according to the combination of at least one candidate points based on a number of at least one candidate points, and
estimate the at least one candidate point corresponding to the calculated matching value as a location of the at least one transmission end when the calculated matching value is larger than or equal to the threshold value.

11. The electronic device of claim 5, wherein the processor is configured to:
determine and register at least one dominant grid among the at least one determined active grid,
update a number of at least one registered dominant grids according to whether the transmission end information is received from the at least one transmission end, and
determine whether the at least one transmission end has become extinct based on a ratio of a number of updated dominant grids to the number of registered dominant grids.

12. The electronic device of claim 11, wherein the processor is configured to:
determine active grids occupied by a plurality of transmission ends among the at least one determined active grid as dominant grids,
increase dominant values corresponding to the determined dominant grids at a predetermined rate when the transmission end information is received from the at least one transmission end, and
register corresponding active grids as the dominant grids when the increased dominant values are larger than or equal to a threshold value.

13. The electronic device of claim 12, wherein the processor is configured to:
perform a normalization to make a sum of the dominant values corresponding to the at least one determined dominant grid 1,
update the dominant values of the corresponding dominant grids when the transmission end information corresponding to the at least one dominant grid is received from the at least one transmission end,
release the dominant grids when the updated dominant values are equal to or smaller than a threshold value, and update the number of registered dominant grids based on the released dominant grids.

14. The electronic device of claim 13, wherein, when the ratio of the number of updated dominant grids to the number of registered dominant grids is equal to or smaller than a threshold value, the processor is configured to determine that the coverage corresponding to a corresponding transmission end has become extinct.

15. A method of estimating a location by an electronic device, the method comprising:
collecting transmission end information acquired from at least one transmission end and location information of a point where the transmission end information is acquired through a communication module by at least one external electronic device;
generating a coverage map corresponding to the at least one transmission end based on the collected transmission end information and location information, the coverage map including a plurality of grids divided into a predetermined size and shape;
estimating locations of the at least one transmission end based on the generated coverage map; and
determining whether a coverage corresponding to the at least one transmission end in the generated coverage has been extinct based on a change in a number of at least one dominant grid corresponding to the coverage among the plurality of grids.

16. The method of claim 15, wherein the generating of the coverage map comprises:
quantizing to map the location information to the plurality of grids;
determining at least one active grid based on the transmission end information corresponding to the location information among the plurality of quantized grids; and
configuring the coverage of the at least one transmission end to include the at least one determined active grid.

17. The method of claim 15, wherein the estimating of the location of the at least one transmission end comprises:
configuring at least one candidate point among a plurality of grids included in the coverage;
calculating location estimation values for the grids included in the coverage based on the at least one configured candidate point by using the transmission end information; and
estimating a candidate point including a maximum value of the calculated location estimation values as a location of the at least one transmission end.

18. The method of claim 17, wherein the calculating of the location estimation values for the grids included in the coverage comprises:
calculating a distance rank between the at least one candidate point and each of the grids;
calculating a Timing Advance (TA) rank corresponding to each of the grids based on the transmission end information; and
calculating a rank correlation between the distance rank and the TA rank calculated for each of the grids and configuring the calculated rank correlation as the location estimation value.

19. The method of claim 17, wherein the calculating of the location estimation values for the grids included in the coverage comprises:
calculating a distance rank between the at least one candidate point and each of the grids;
calculating a Received Signal Strength Indicator (RSSI) rank corresponding to each of the grids based on the transmission end information; and
calculating a rank correlation between the distance rank and the RSSI rank calculated for each of the grids as the location estimation value.

20. The method of claim 17, further comprising:
calculating a location estimation value of each of n clusters corresponding to n candidate points and calculate matching values according to a combination of the n candidate points when a number of candidate points is n; and
estimating a candidate point including a maximum value among the calculated matching values as the location of the at least one transmission end.

* * * * *